US012456351B2

(12) United States Patent
Wong

(10) Patent No.: US 12,456,351 B2
(45) Date of Patent: Oct. 28, 2025

(54) CONFERENCING SYSTEM FOR EVENT MONITORING RELATIVE TO RECORDED EVENT PREDICTIONS

(71) Applicant: Vivid Seats LLC, Chicago, IL (US)

(72) Inventor: Kuo-Hsiung Wong, North Bergen, NJ (US)

(73) Assignee: Vivid Seats LLC, Chicago, IL (US)

( * ) Notice: Subject to any disclaimer, the term of this patent is extended or adjusted under 35 U.S.C. 154(b) by 325 days.

(21) Appl. No.: 18/249,977

(22) PCT Filed: Oct. 25, 2021

(86) PCT No.: PCT/US2021/056476
§ 371 (c)(1),
(2) Date: Apr. 21, 2023

(87) PCT Pub. No.: WO2022/087528
PCT Pub. Date: Apr. 28, 2022

(65) Prior Publication Data
US 2024/0013630 A1    Jan. 11, 2024

Related U.S. Application Data

(60) Provisional application No. 63/104,820, filed on Oct. 23, 2020.

(51) Int. Cl.
G07F 17/32 (2006.01)
(52) U.S. Cl.
CPC ........ G07F 17/3276 (2013.01); G07F 17/323 (2013.01); G07F 17/3258 (2013.01); G07F 17/3288 (2013.01)

(58) Field of Classification Search
None
See application file for complete search history.

(56) References Cited

U.S. PATENT DOCUMENTS 10,467,327 B1 *  11/2019  Arazi ............... G06Q 30/02
11,625,980 B2 *   4/2023  Huke ............... G07F 17/3276
                                              463/25
11,882,240 B2 *   1/2024  Batlle .............. H04M 3/5166
2006/0218179 A1*  9/2006  Gardner ............ G06Q 40/06
                                              707/999.102
2007/0011073 A1*  1/2007  Gardner ............ G06Q 40/00
                                              705/35
2018/0071637 A1   3/2018  Baazov et al.
2019/0244485 A1   8/2019  Jones

* cited by examiner

Primary Examiner — Ronald Laneau
(74) Attorney, Agent, or Firm — CALYX LAW LLP; Frank L. Gerratana

(57) ABSTRACT

A method, a system, and computer program product for managing container artifacts are provided. Data associated with a posted contest is received from a database. User inputs including user predictions on the posted contest are received from devices that are communicatively coupled in a conference setting. A winning group of the posted contest is identified to receive a reward, based on a posted contest outcome and a threshold number of won contests of each user device over the period of time. A notification of the winning group of the posted contest is transmitted to the user devices.

18 Claims, 28 Drawing Sheets

CONFERENCING SYSTEM FOR EVENT MONITORING RELATIVE TO RECORDED EVENT PREDICTIONS

CROSS REFERENCE TO RELATED APPLICATIONS

This application is a U.S. National Stage Entry of the International Patent Application No. PCT/US2021/056476 filed on Oct. 25, 2021, which claims the benefit of priority to U.S. provisional patent application No. 63/104,820, filed on Oct. 23, 2020, the entireties of which are hereby incorporated by reference herein.

BACKGROUND OF THE INVENTION

Field of the Invention

The invention relates to a contest entry system and methods of wagering on said contest.

Background

Online wagering has grown in popularity but lacks some features that may improve the experience for those participating.

SUMMARY OF THE INVENTION

The invention is directed to an electronic wagering system and methods of wagering on said contest, particularly an online contest entry system and unique methods of wagering and presenting contests for wagering thereon. The electronic wagering system provides unique types of wagers, groups that can be entered through selection or through system engagement. The electronic wagering system enables users to follow each other and notifications may be provided to users when a followed user enters a contest. The electronic wagering system may provide increased payouts, rewards or other incentives as a result of the number of contest entered, sum of the wagers, number of users placing wagers on a contest, and/or number of users following or being followed by other users also in the contest. The electronic wagering system may provide partial payouts as a result of making partial correct picks for combined contests or for a propositional outcome that is within a threshold of a contest proposition. The electronic wagering system may provide Experience Points hereinafter XP, for engagement with the electronic wagering system, such as number of contests entered, percentage contests won, or amount wagered on the contests. The electronic wagering system has social and gamification features to make entering contests more entertaining and to provide network effects for friends and groups to interact with while entering and wagering on contest.

An exemplary electronic wagering system may provide an increased payout or boost in the payout to a first user when a following user or followed user also enters a contest that the first user enters, or when the First User invites another user or invites a threshold number of users to join a contest. An exemplary electronic wagering system may provide an increased payout or boost in the payout to a first user when a threshold number of following users or followed users also enters a contest that the first user enters. The electronic wagering system may provide an increased payout or boost in the payout when a threshold number of users of the electronic wagering system wager on a contest or wager over a threshold cumulative wager amount on the contest.

An exemplary electronic wagering system enables a First User to follow a Second User, wherein users can have a set of following users. A following user may receive notices of contest that a followed user has entered. This may entice the following user to also enter the contest and place a wager. In some cases, a user may select to be automatically entered into a contest that a followed user enters. The electronic wagering system may provide a reward, increase a payout or improve the odds of the contest for the First User if a threshold number of following users enters a contest that the First User enters. Also, the electronic wagering system may provide a reward, increase a payout or improve the odds of the contest for the First User and all following users if a threshold number of said users enter a contest.

An exemplary electronic wagering system may have groups that a user can join or be entered into through some engagement with the electronic wagering system. The electronic wagering system may again track a user's entered contests and enter them into a sports team fan group for a sports team or a sports person fan group when they enter contests on said team or enter propositional contest for said sports person. The electronic wagering system may have groups that a user is entered into for some wagering metric, such as number of contests entered, number or percentage contests won, cumulative amount of wagers on said contests, all of which may be metrics that are considered over a period of time, such as number of contests entered per month. For example, a high rollers group may be for users that wager a certain amount over a period of time. There may also be fan groups for users that place a threshold wager amount or a enter a threshold number of contests on a sports team or sports person.

A group may be based on the number of contests entered and/or won by a user. A group may be an active members group that enters a threshold number of contests over a threshold period of time. A champions percentage group is a group for users that have won a threshold percentage of contests, such as 70% or more, 80% or more, 90% or more and any range between and including the percentages provided. A champions selector group is for users that win a threshold number of contests, again, which may be considered over a period of time. A rival group may be for users that enter contests on rivalry contests, contests between sports teams that are considered rivals, Duke versus North Carolina in college basketball for example.

A group may be a geographical group that is determined by geographical location or preference selected by the user. For example, a user may live in New York city and the electronic wagering system may alert the user of contest involving teams from New York city. A group may be a conference group, such as the Atlantic Coast Conference (ACC) and again, the electronic wagering system may alert a user of contests involving teams from this conference.

The electronic wagering system may send exclusive contests to members of groups and these contests may have different odds of winning than contests presented to users outside of these groups. For example, the champions selector group may be presented with a contest with increased odds of winning over the same contest presented to users outside of this champions selector group.

An exemplary electronic wagering system may provide data to users of a particular group performance, such as the percentage of contests won, amount wagered, number of contests entered, number of people in the group. Also, the electronic wagering system may provide comparison data between groups. For example, the electronic wagering system may present or make available data regarding the number contests entered from rivalry groups. The data may encourage users to enter a contest.

An exemplary electronic wagering system may include contests of various types, including propositional contest, such as will the Broncos have more than 150 yards rushing. A propositional contest is based on some propositional outcome, which may be a numeric performance outcome, such as rushing or passing yards in a football game. A propositional contest may also be a non-performance outcome, which may non-numeric, such as the color of the sports drink thrown on the winning coach. The electronic wagering system may have combined contest that includes two or more propositional contests within one wager, such as will the Broncos have at least 150 yards rushing and also will they kick at least two field goals. In this combined contest, both of the performance propositional outcomes would have to be met to win the contest. A partial win provides a partial payout when a portion of the propositional outcomes are met within a combined contest. A combined propositional contest requires two or more propositional outcome selections by the user, such as three or more, four or more, five or more and any range between and including the number of propositional outcome selections provided. The payout for getting all picks correct may increase for the number of contests within a combined contest.

An exemplary electronic wagering system may have other types of contests to encourage engagement. A contest may be a win/lose/draw contest, such as will the Broncos win, or it may be a win/lose/draw spread contest, having a spread, such as will the Broncos win when given three points over the Eagles, wherein three points is the spread. A contest may be a totals contest, commonly referred to as over/under, based on the total points, goals, runs or score of the contest.

A contest may be a race and the contest may allow a user to pick a finishing position for a participant or group of participants in the race, such as win, place or show. A contest may be a graduated contest wherein the wager is set on a graduated outcome and the payout is graduated based on outcome. A graduated contest has a wager threshold and one or more graduated levels of outcomes above or below this wager threshold, wherein the payout is based on these graduated levels. For example, the graduated contest may be that Labron will hit 10 three pointers and if Labron hits 8 three pointers then there will be a payout that is lower than the payout if he hits 10 three pointers. Also, there may also be a greater payout if Labron hits more than 14 three pointers.

A contest may be an achievement contest wherein the wager is set on an achievement outcome and the payout is based on said achievement outcome. For example, the contest may be $10 for every 10 points over 22 points scored, or $10 for every three-pointer made in a basketball game. Also, there may be an incremental payout wherein the payout includes an incremental bonus payout for each incremental achievement outcome over the wagered achievement outcome, such as $2 more in payout for each three pointer over 10. There may be a cap on the payout or there may be unlimited pay out for achievement above some threshold level.

A contest may be a blind contest wherein the information of the participants in the contest, such as the team's names, are kept secret from the users until after the contest is over. Other information, such as the type of event, or the odds or spread of the event may be provided to the user.

A contest may be an anonymous head-to-head contest that is presented to a Second User of wagerer of the electronic wagering system by another a First User of the electronic wagering system with their identity hidden, or not revealed to the Second User. The identity of the First User may be revealed to the Second User at the end of the contest.

An exemplary electronic wagering system may include head-to-head contests, wherein a First User wagers against at least one other user. This head-to-head contest may be for any type of contest as described herein and may increase the social aspect of the electronic wagering system. The electronic wagering system may receive an administrative fee for head-to-head contests and this may be collected from one, both or all parties in the head-to-head contest.

Any of the contests described herein may be pre-game contests, wherein the wager is placed before the start of the contest or an in-game contest, wherein the wager is placed during the contests. The odds or the spread may be changed for in-game contest over those presented in pre-game contests.

An exemplary electronic wagering system may alert users of contest of various types and may track a user's wagers to determine what types of contests they most often enter. The electronic wagering system may then present the users with contests that match their preferences. An exemplary electronic wagering system may send users of a fan group an alert of a rivalry contest as they may be likely to joint the contest.

An exemplary electronic wagering system may reward users with a reward for engagement with the electronic wagering system and the reward may be random, or may be based on some specific interface with the electronic wagering system. A reward may be experience points (XP), a gift certificate, a discount to an event, such as a future contest event, a gift certificate or discount on merchandise, such as merchandise for a team involved in a contest and/or a ticket to an event. A reward may be provided for a threshold number of contests entered, a threshold wager amount placed, number of contests won, messaging on the electronic wagering system, inviting followers to join a contest, invited followers entering a contest they have been invited to, timing of contests entered, or again, random. A reward may be provided to a first set of users that enter a contest or to all of the users that enter a contest if a threshold amount is wagered, or a threshold number of users enter said contest. A reward may be provided when enough Experience Points (XP) is cumulated by a user.

An exemplary electronic wagering system may provide a payout for wining a contest or may provide a partial payout for certain outcomes of a contest. For example, a user may receive a partial payout for having a partial win in a combined contest. A partial payout may be provided for a propositional outcome that meets a threshold that is below the wagered propositional outcome. In an exemplary embodiment, a user may receive Non-Monetary System Cash (NMSC) or Betting Bucks from the electronic wagering system for system participation and/or contest wins, and a monetary payout may be received when wagering with the NMSC, as described herein.

An exemplary electronic wagering system may provide improved odds for a user to win a contest based on engagement. For example, when a person earns a threshold amount of XP, they may have an increased spread for a contest to improve their odds of winning. For example, if the spread on the Broncos vs. Eagles game is 3 points to the Broncos, the user may get five points when picking he Broncos to win. In another example, a user may select a horse to win, but if they have enough XP points, they may win if the horse wins or shows.

An exemplary electronic wagering system may provide a messaging feature, wherein users can post comments, pictures and/or videos on the site. The messaging may be set up as blogs or threads that are searchable by keyword, such as team, player or participant in a contest or a person's name or contest. Also, the electronic wagering system may enable messaging between a group, such a group of followers and the followed user, or a fan group, or a friend's group. The electronic wagering system may also enable messaging between two or more users, wherein the communication is private from other users. The communications and messaging described herein may be only visible to the group or to any and all users. For example, a high-rollers group may have a chat room that is only accessible to users in the high-rollers group.

Definitions

A contest is a system where a person predicts one or multiple outcomes, and wins or loses based on the accuracy of the predictions; including head-to-head contests where the outcome is determined based on the accuracy of one set of predicted outcomes relative to another set of predicted outcomes.

A pick as used herein, is defined as a user selecting an outcome on said predicted outcome. For a combined contest, the user may be required to make separate picks for each predicted outcome.

A propositional contest is a contest on a proposed outcome, such as a quarterback throwing a number of touchdowns during a game, or a running back rushing for a number of yards during a contest; a propositional outcome is not on the final outcome of the contest or game. A propositional result is the actual outcome for said proposed outcome from said contest. A propositional contest may be a participant performance propositional contest that is based on a proposed performance outcome of one of the participants in the contest. A propositional contest may be a team performance propositional contest that is based on a proposed performance outcome of a team in the contest. A propositional contest may be a non-performance propositional contest that is based on a proposed outcome that is a non-performance outcome, such as the color of the sports drink thrown on the winning coach.

A win/lose/draw contest is a contest on the final outcome of a competitive event and may be spread win/loss/draw contest wherein one team must win by more than the spread to win the contest. A win/lose/draw contest may be a money line win/lose/draw contest wherein the payout is adjusted based on a spread or odds of a team winning the contests. A contest outcome is based on a final result of the contest.

A contest may be a totals contest that is a contest that a combined goal, point run or score total of a single game will be over or under the proposed number in the contest.

A combined contest includes more than one contest, such as two or more propositional contests.

Wager, as used herein, is defined as a contest entry fee and may be currency from a user's balance on the electronic wagering system or may be non-monetary system cash (NMSC). Placing a wager to enter a posted contest means the user submits the wager which may be currency, such as from a monetary currency balance on the electronic wagering system, or NMSC.

Wagering is the act of submitting a contest entry fee to enter a contest including monetary fees and NMSC, and in an exemplary embodiment, is not limited to betting or wagering as defined by the Unlawful Internet Gambling Enforcement Act, 31 U.S.C. § 5361, the revision of this act.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
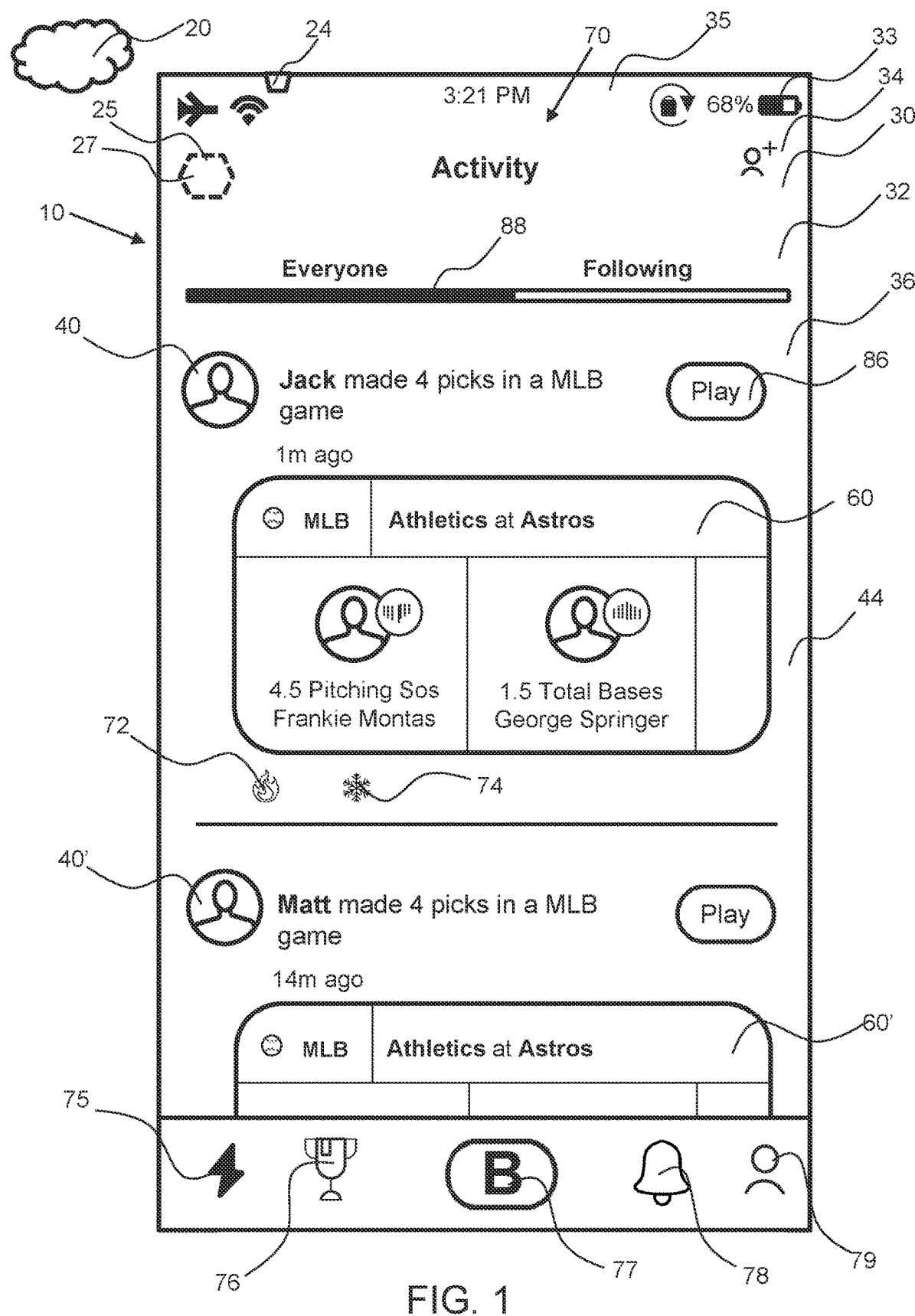
FIG. 1 shows a display of an Activity page of the electronic wagering system showing wagers made by wagerers.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

FIGS. 1 to 28 show a display 33 on a display screen 34 of a computer 35 having a processor 27 that operates a computer program 25 of the electronic wagering system 10. The website 30 or mobile app 32 produces various displays 33 on a display screen 34 of a computer 35, including a tablet computer or a mobile phone 36. A transceiver 24 may communicate wirelessly via a wireless signal with a database 20 to receive updates and new content and confirm contest entries. Many of these details are shown only in FIG. 1 for clarity.

FIG. 1 shows a display of an Activity page 70 of the electronic wagering system 10 showing wagers made by users 40, 40' of the electronic wagering system. The website 30 or mobile app 32 produces various displays 33 on a display screen 34 of a computer 35, including a tablet computer or a mobile phone 36. A user of the electronic wagering system may use this system interface 44 to view contests entered by followers, or those that they are following and enter contests by placing a wager on a posted contest, for example. The computer or mobile phone may have a wireless signal transceiver 24 that interfaces with a database 20 of the electronic wagering system to receive content and updates and to submit contest entries. The Active User, the user operating the device and viewing the display, has selected to view wagers placed by "Everyone" on the electronic wagering system as indicated by the dark color under "Everyone" on the selection bar 88 at the top of the page. A list of contests 60, 60' entered by system users 40, 40' are shown on the display screen. The Active User may scroll the screen to see additional contest entered by other users. An entry icon 86, labeled as "Play", enables a user to open the contest 60 entered by another user and then enter the contest. The Active User may also hit the like icon 72 or dislike icon 74 to show if they like or dislike the contest. The number of likes and dislikes and the identity of the users that like or dislike a contest may be shown to the Active User as well as the user Jack, that had originally entered the contest. There are a number of icons along the bottom of the display.

The Activity page icon 75 is the lightning bolt and this is the page that is open by the electronic wagering system. The trophy icon 76 opens a Challenge page which may include leaderboard information. The home page icon 77 is a link to a home page that shows contest for entry and promotions details. The notification icon 78 is the bell and opens a notification display that may show likes or dislikes for the Active User's entries into contests, and may show other users that recently followed the Active User. The Profile page icon 79 is the icon of a person that opens the Active User's profile page that shows the Active User's awards, badges, and who follows the Active User.

Figure 2:
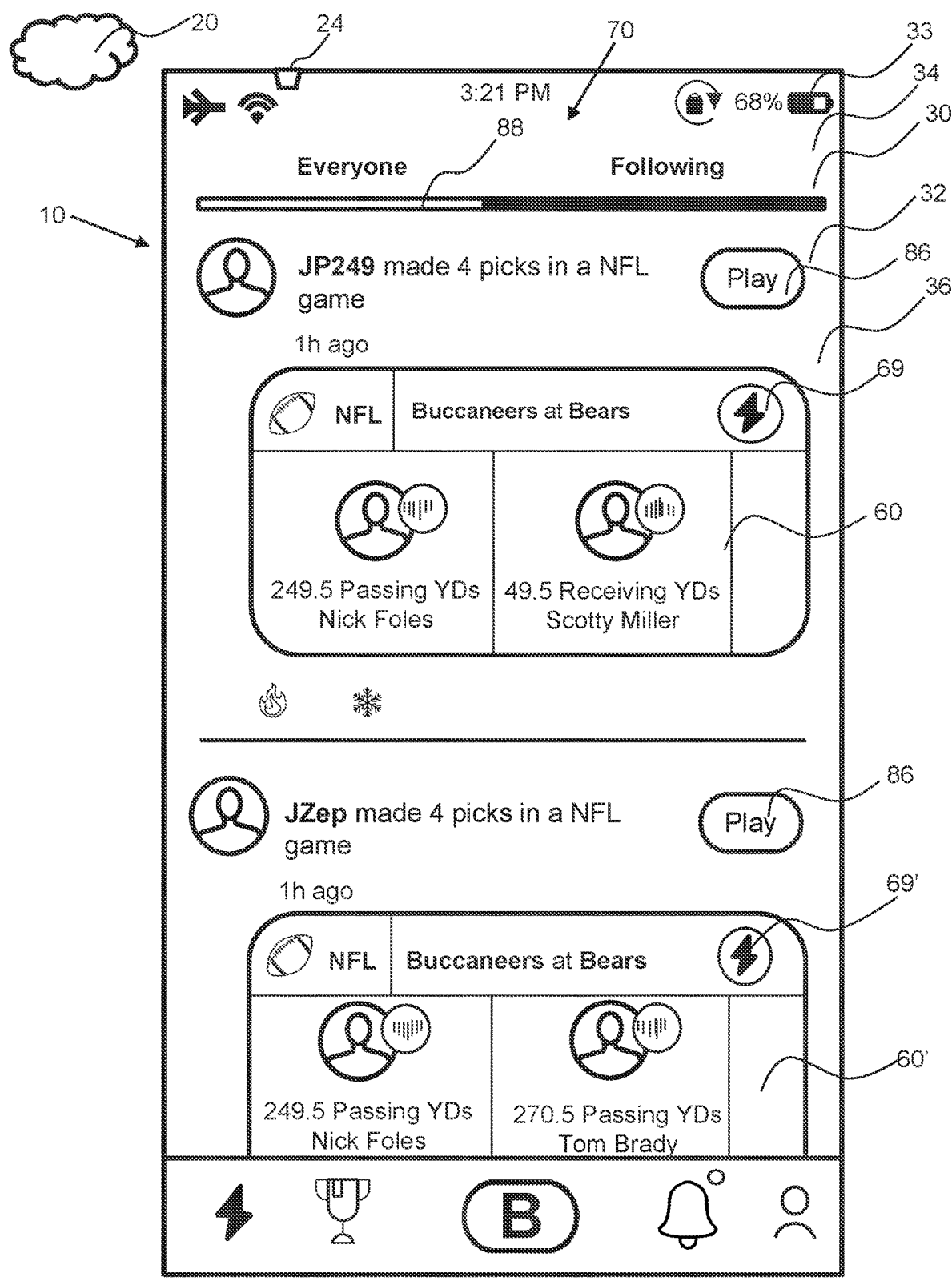
FIG. 2 shows a display of an Activity page of the electronic wagering system with contests labeled as eligible for boosted payouts, as represented by the lightning bolt icon in the top right corner of each contest summary, as these are contest entries are those that the wagerer's following wagerers have already entered.

As shown in FIG. 2, the Activity page 70 is now showing activity of the Following Users of the Active User, as indicated by the dark color under "Following" on the selection bar 88 at the top of the page. Contests previously entered by a user that the Active User is following, may have boosted payouts for the Active User, as indicated by the boosted icon 69, the lightning bolt in the circle next to the contest 60, 60'. The active user may use the entry icon 86 to join a contest and the payout may be boosted for additional incentive to join.

Figure 3:
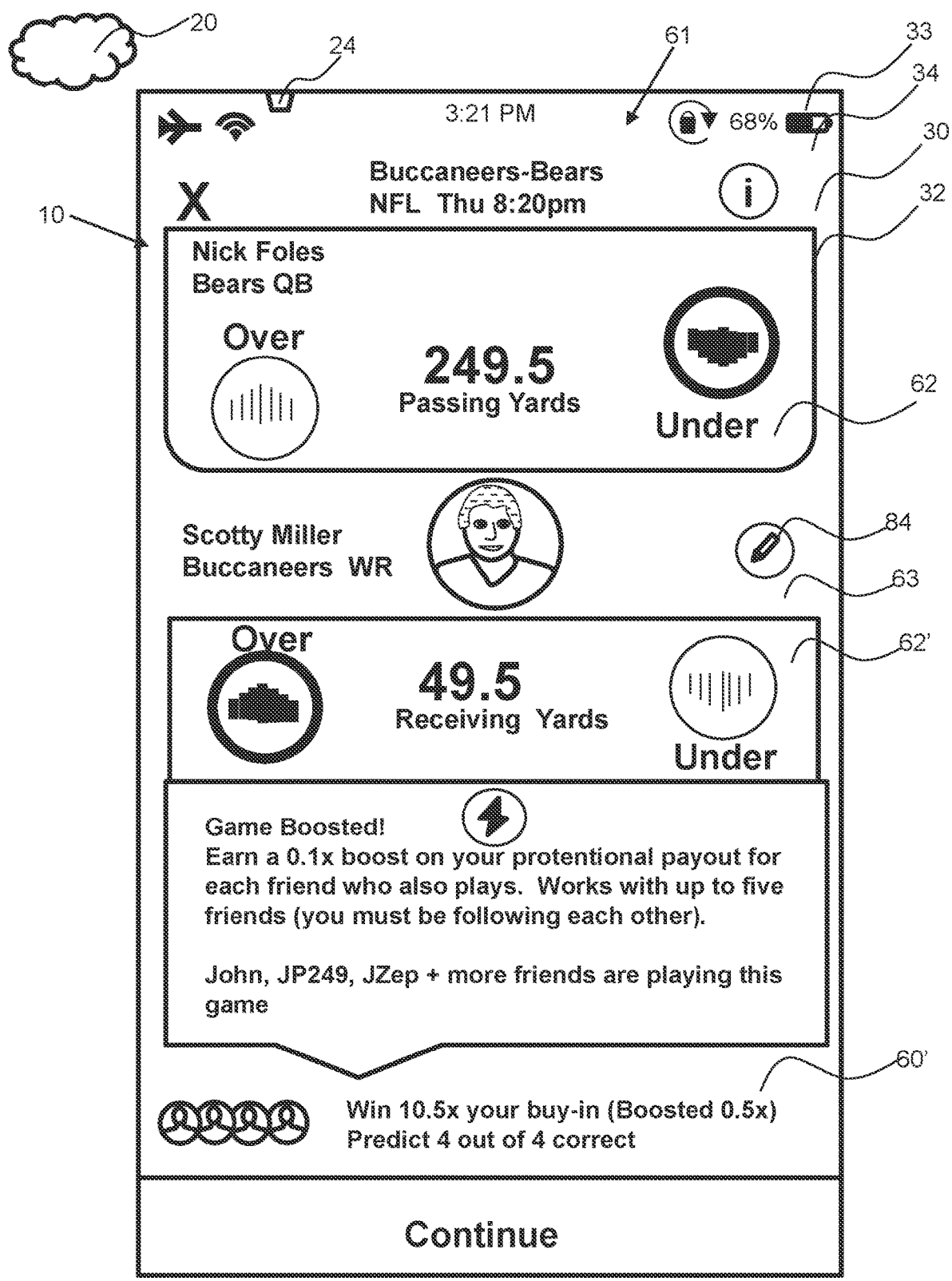
FIG. 3 shows a display of a Contest page having a reward, a 0.1× boost of a potential payout, for each following friend that enters the contest, which is arrived at by choosing the contest as illustrated in FIG. 2; the picks are the same as those of the user's following friend, and one can see the friends who are in the contest as well as the rewards.

As shown in FIG. 3, a Contest page 61 enables the active user to select an entry to the contest. The contest shown is a combined propositional contest 63 having two propositional contests 62, 62', that each require an entry or selection by the Active User. As shown, the Active User has selected "Under" for Nick Foles having 249.5 passing yards and "Over" for Scotty Miller having 49.5 receiving yards. In addition, this contest includes a reward, a 0.1× boost of a potential payout, for each following friend that enters the contest. This contest page may be opened by selecting the top contest shown in FIG. 2. Note that the active user has selected the same outcomes as the friend the active user is following. As shown at the bottom of the page, the Following User's names are shown. When the Active User clicks on the entry Icon 86 shown in FIG. 1, the electronic wagering system will open a contest page with the same selections as the friend and then the Active User can edit the selection of over or under as desired or enter with the same picks as shown in FIG. 1.

Figure 4:
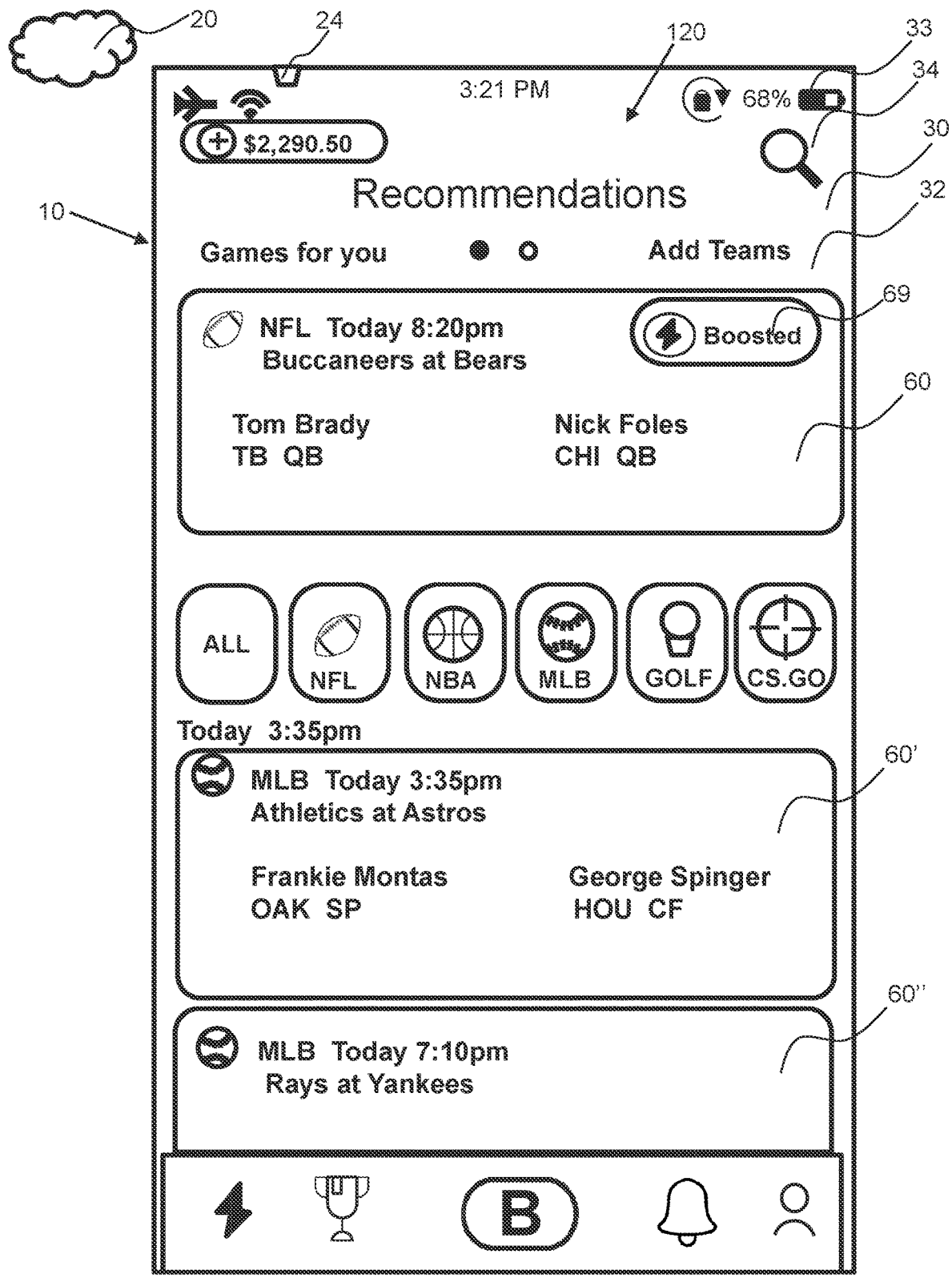
FIG. 4 shows a display of a Recommendation page of the electronic wagering system contests wherein recommended contests are presented to the user and wherein some of the contests have a boosted reward, for example because the contest is also entered into by someone that the user is following, or is part of the user's friend group.

As shown in FIG. 4, a Recommendation page 120 of the electronic wagering system 10 presents recommended contests 60, 60', 60" for the active user to consider entering. Some of these recommended contests may be boosted which may be an incentive to join the contest. The contests may be recommended and boosted because the contest is also entered into by someone that the Active User is following or is part of the Active User's friend group. Boost may also be provided for wagers on teams that the Active User is following, teams that the Active User has recently entered contest for, Following User contests and contests that are hot, those many people are wagering on.

Figure 5:
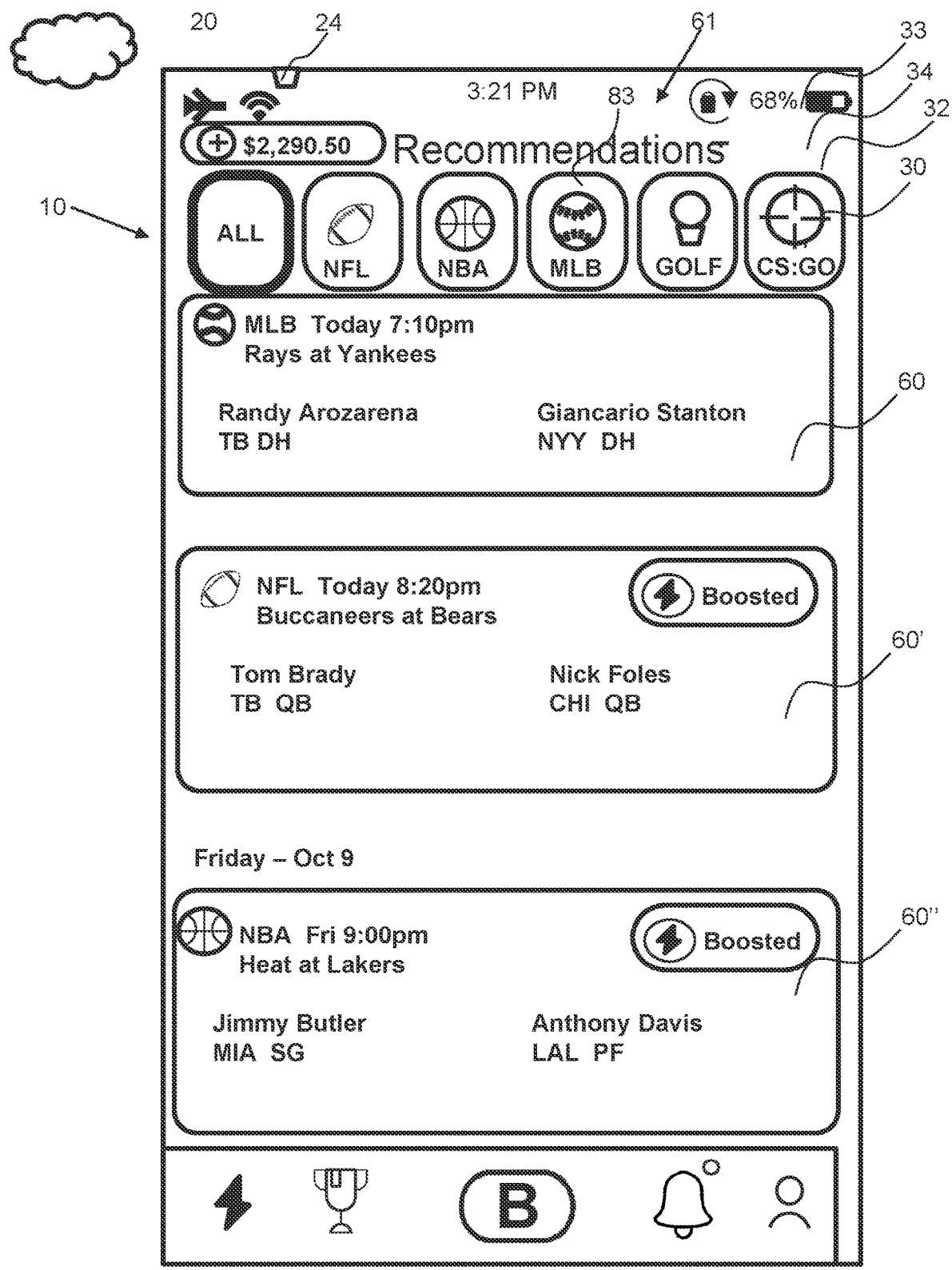
FIG. 5 shows a display of a Recommendation page with sports selection icons at the top of the page.

FIG. 5 shows a display of the Recommendation page 120 from FIG. 4 scrolled up. The Recommendation page 120 has sports selection icons 83 at the top to sort contest by sports type. An active user may select one of the sports icons, such as the National Football League (NFL) icon to view contests for entry from the NFL. The other icons include ALL, that shows all sports, which is selected, National Basketball Association (NBA), Major League Baseball (MLB), Golf, and Counter-Strike:Global Offensive (CS:GO) a computer game played by teams with a winner outcome. Note that other types of computer games may have contests for entry on the electronic wagering system 10. The ALL icon is selected and contests 60, 60', 60" from a variety of sports are shown. Again, the user may scroll the contests up to view additional contests for entry.

Figure 6:
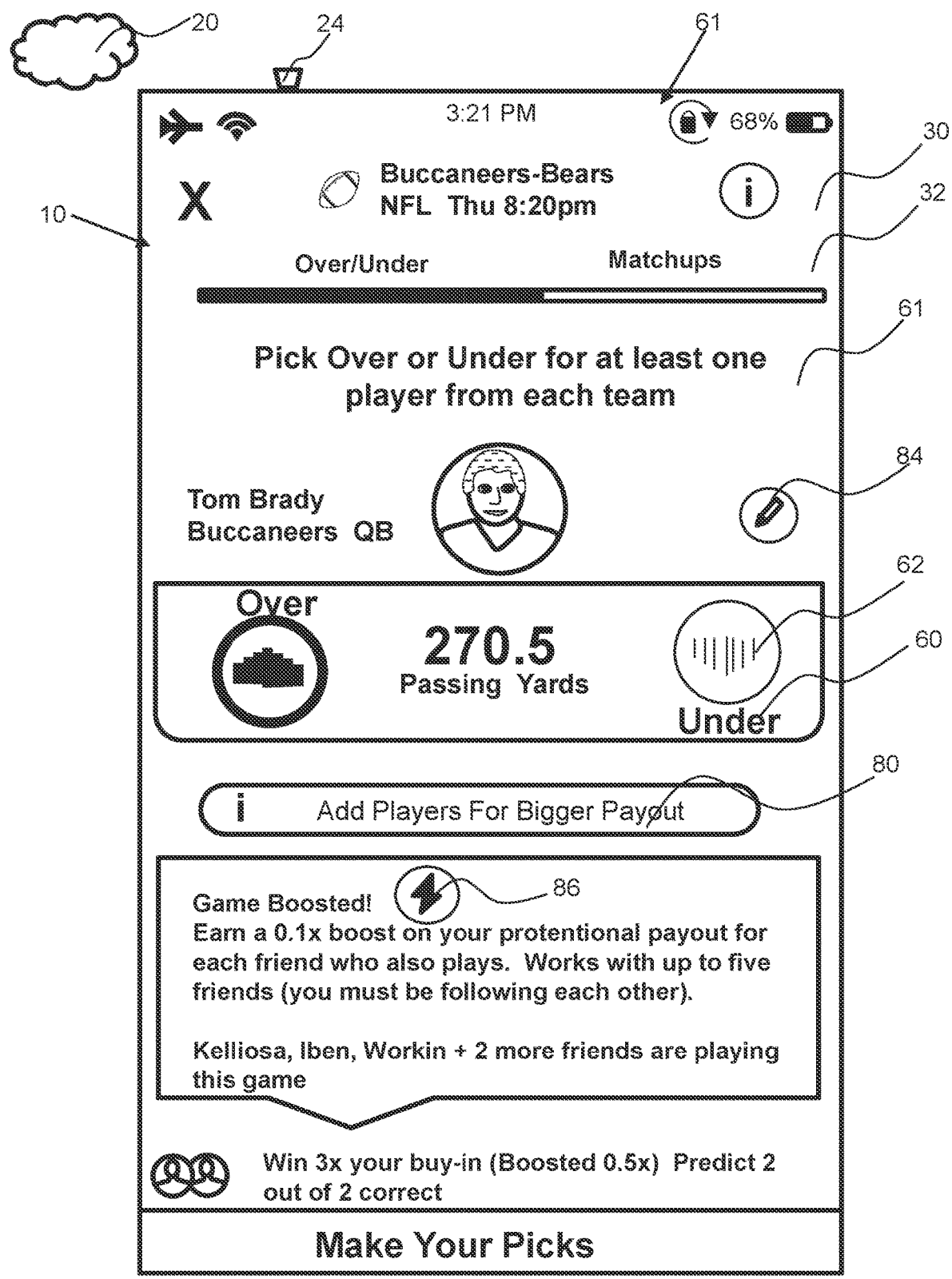
FIG. 6 shows a display of a Contest page of the electronic wagering system having details of a contest, which is arrived at by choosing a contest as illustrated in FIGS. 4 and 5, wherein this contest includes a reward as a potential boosted entry; in this example there are no premade selections because the user is not replicating a friend's picks from the feed as displayed in FIG. 3.

FIG. 6 shows a display of a Contest 61 page of the electronic wagering system having details of a contest 60, a propositional contest 62, which is presented after choosing a contest as illustrated in FIGS. 4 and 5. This contest includes a reward as a potential boosted entry. The Payout is 2.5 the entry amount and can be boosted up to 0.5× if you get five or more friends to join; 0.1× boost per friend that enters the contest. The Active User may also make this contest a combined propositional contest by adding players, by hitting the "Add Player" icon 80 to select an additional player an additional propositional contest for said player.

Figure 7:
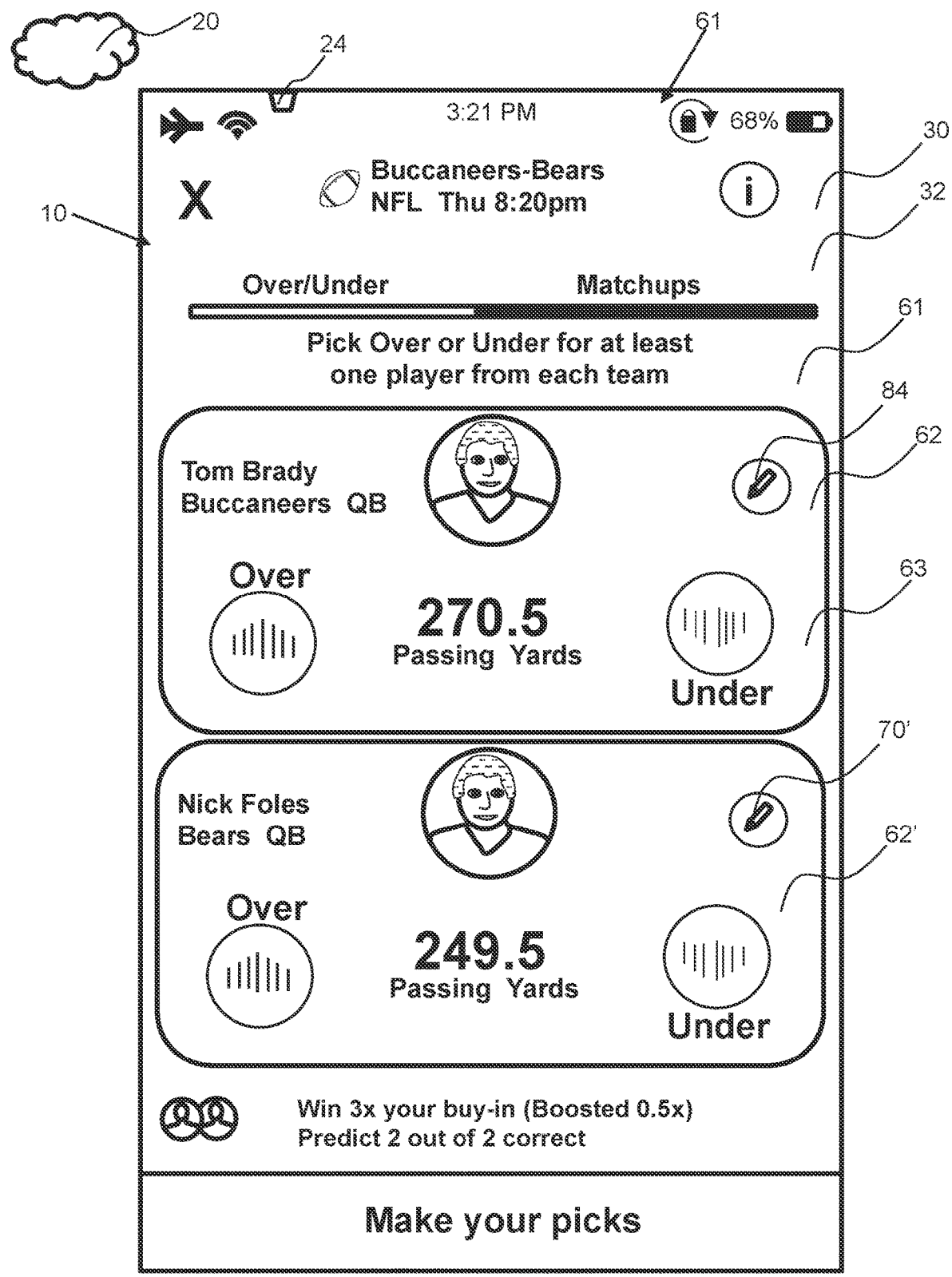
FIG. 7 shows a display of a Contest page of the electronic wagering system with the contest shown in FIG. 6, after the user has clicked on the boost notification, two propositional contests are displayed and therefore this is a combined propositional contest; edit functionality is enabled through the edit icon, shaped like a "pencil" icon on the right of the athletes' headshots.

As shown in FIG. 7, the Contest page 61 of the electronic wagering system shown in FIG. 6, has been updated after the active user clicked on the Add Player button to add an addition selection to make this contest a combined propositional contest 63 with two separate selections. As shown, two propositional contests 62, 62' are displayed and therefore this is a combined propositional contest 63. The contest may be edited by selecting the edit icon 84, shaped like a "pencil" icon to the right of the athletes' headshots. The edit icon may be selected to change players, or change the type of contest proposition, or performance proposition for a player, such as from passing yards to number of touchdowns for Tom Brady. The edit button may also be used to change the performance metric for the player. For example, the passing yards may be increased to 300 yds and the payout may be increased when the Active User increases the performance proposition or metric and selects the Over option.

Figure 8:
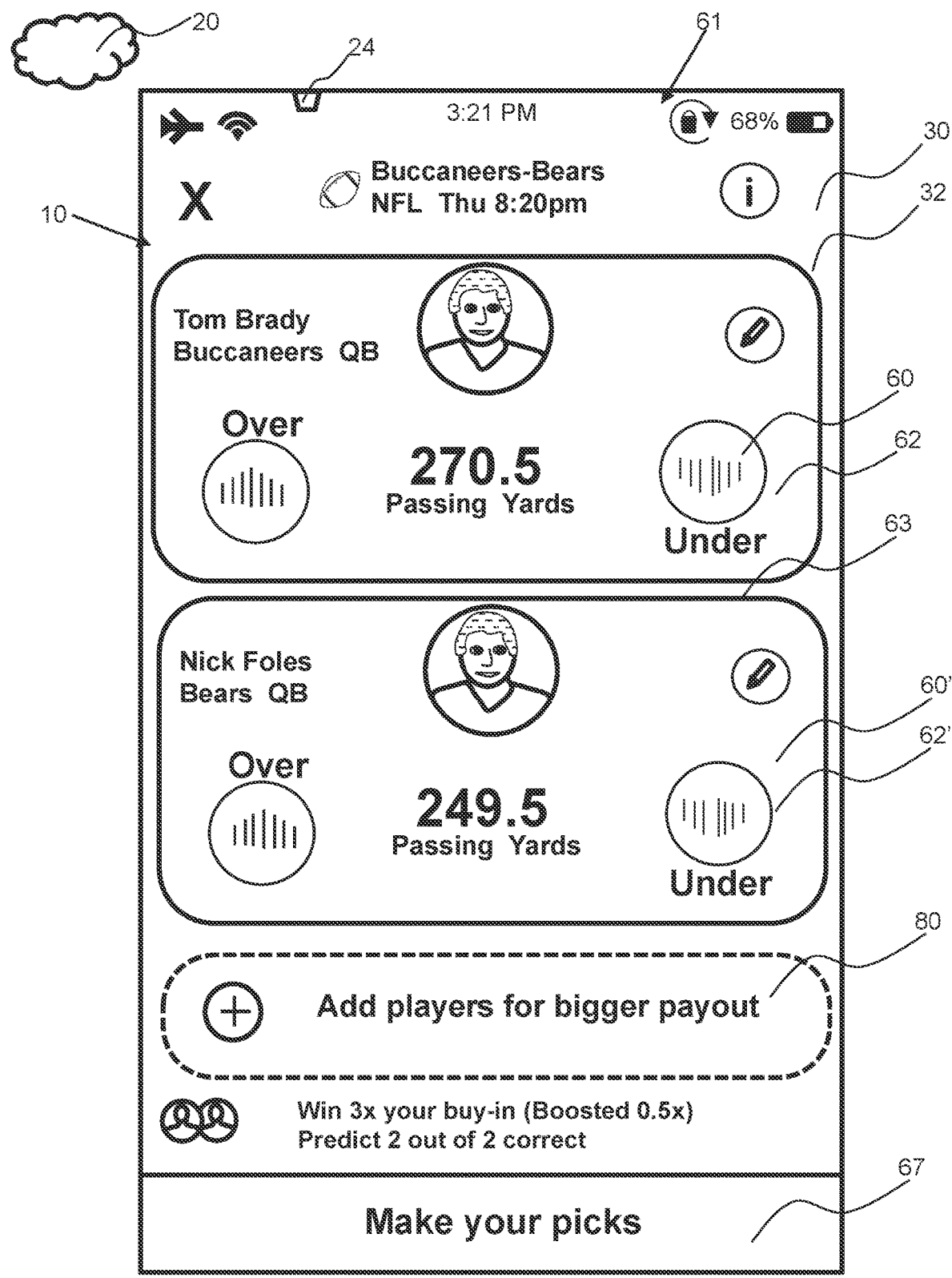
FIG. 8 shows a display of a Contest page of the electronic wagering system showing the contest details of FIG. 7 with a scrolled-up view to illustrate how additional players may be added to the contest.

As shown in FIG. 8, the display shown in FIG. 7 has been scrolled up to show the Add player icon 80, that when clicked on, or selected, enables the Active User to add an additional propositional contest to the combined propositional contest. After the Active User has made their selections, picks, the "Make You Picks" icon 67 changes to "Continue" and selecting "Continue" opens the Contest Entry page shown in FIG. 11.

Figure 9:
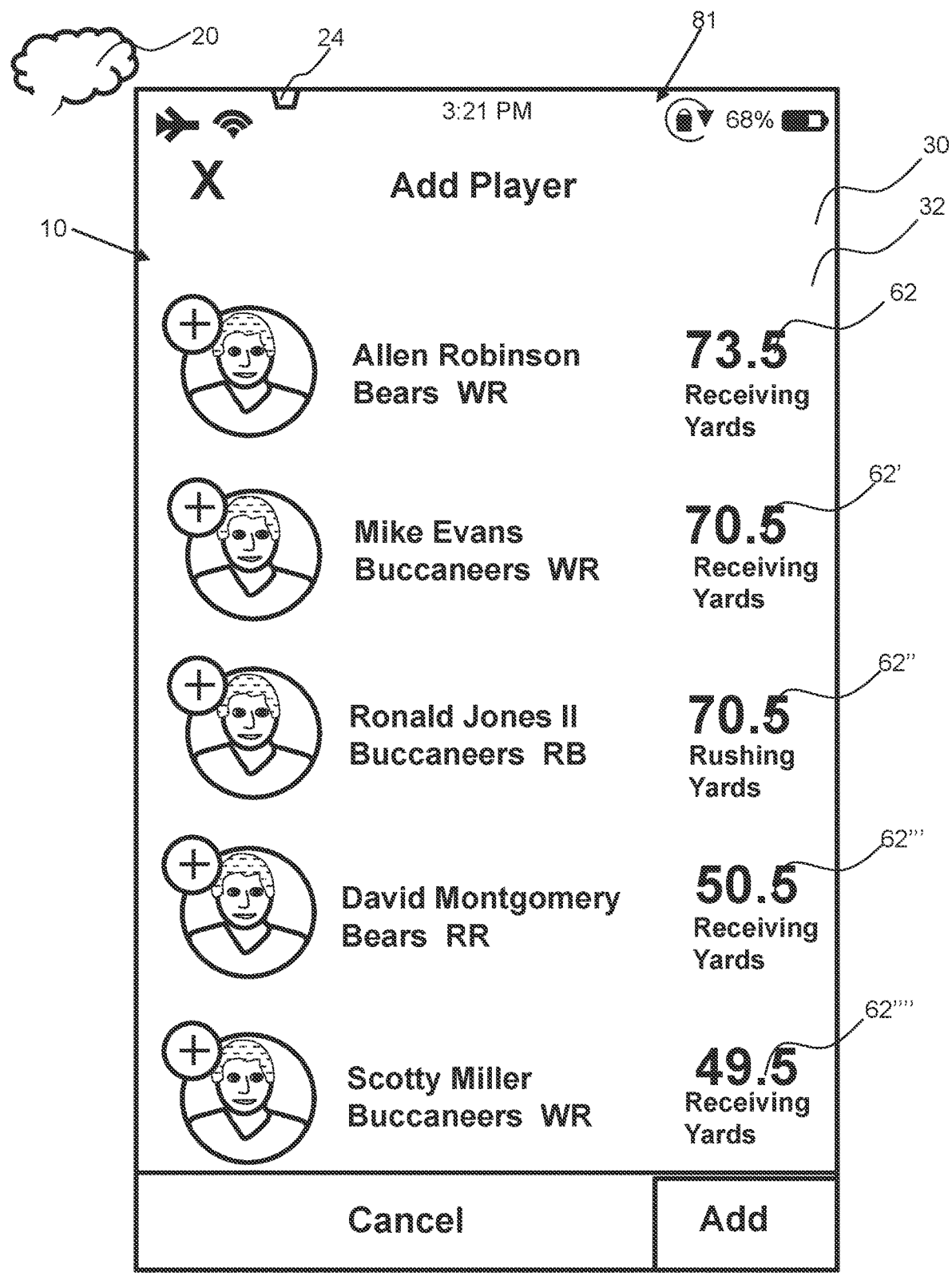
FIG. 9 shows a display of an Add Player page having additional players shown after clicking on the "Add-players" or icon from FIG. 8, or the edit icon from FIGS. 7 and 8; this enables more contests to be added to a combined contest.

FIG. 9 shows a display of an Add Player page 81 having additional players shown and associated propositional contests 62-62"", after clicking on the add-player feature from FIG. 8, or the edit icon from FIGS. 7 and 8. The active user can select any of the listed athletes with their respective propositional contest and then enter a predicted outcome for the propositional contest, over or under, for example.

Figure 10:
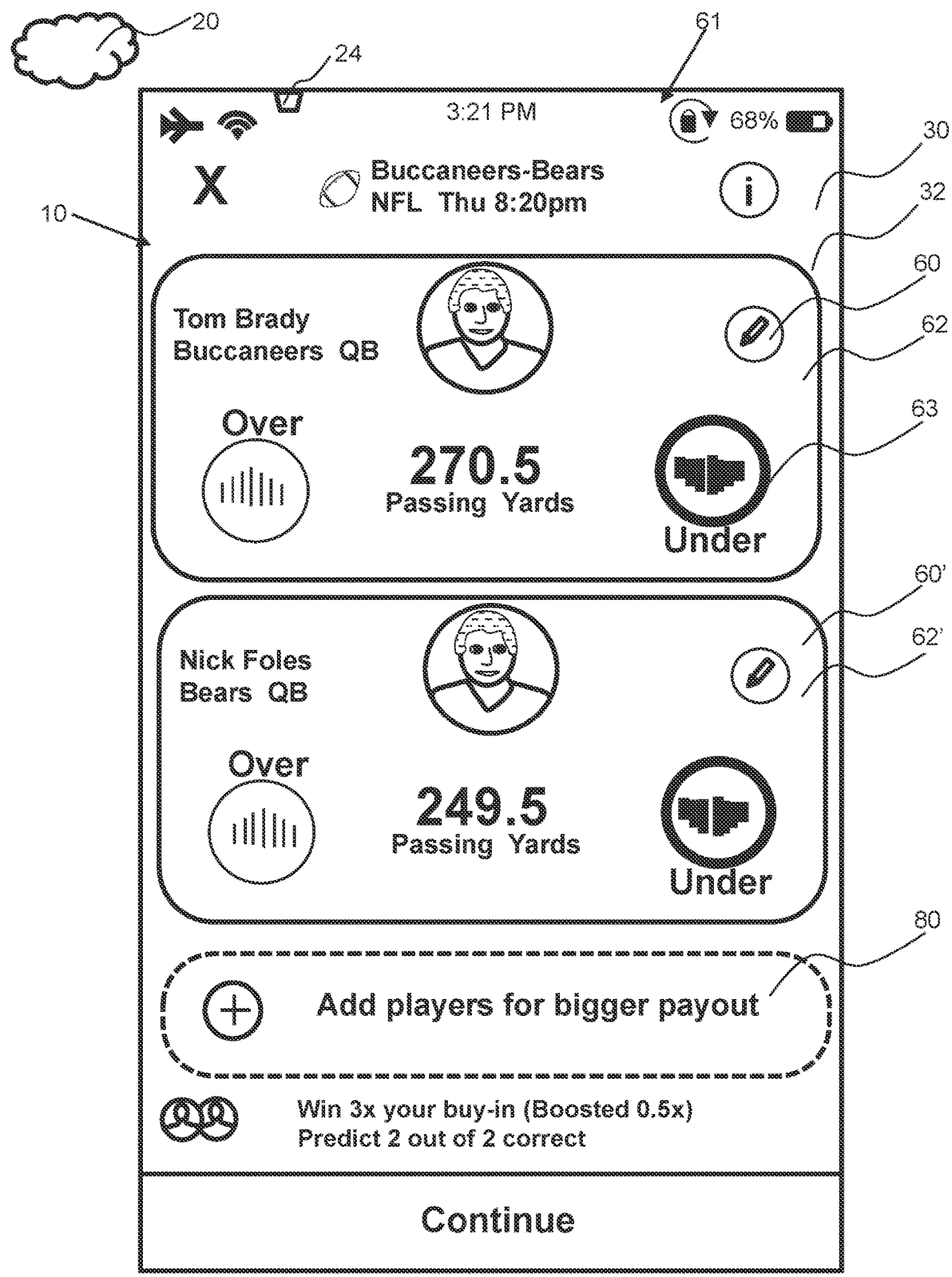
FIG. 10 shows a display of a Contest page with entry details showing that the user has selected both of the under options for the combined propositional contest.

FIG. 10 shows a display of a Contest page 61 with entry details showing that the user has selected both of the under options for the combined propositional contest 63. Again, the user may use the Add Player icon 80, to add additional propositional contest to the combined propositional contest 63.

Figure 11:
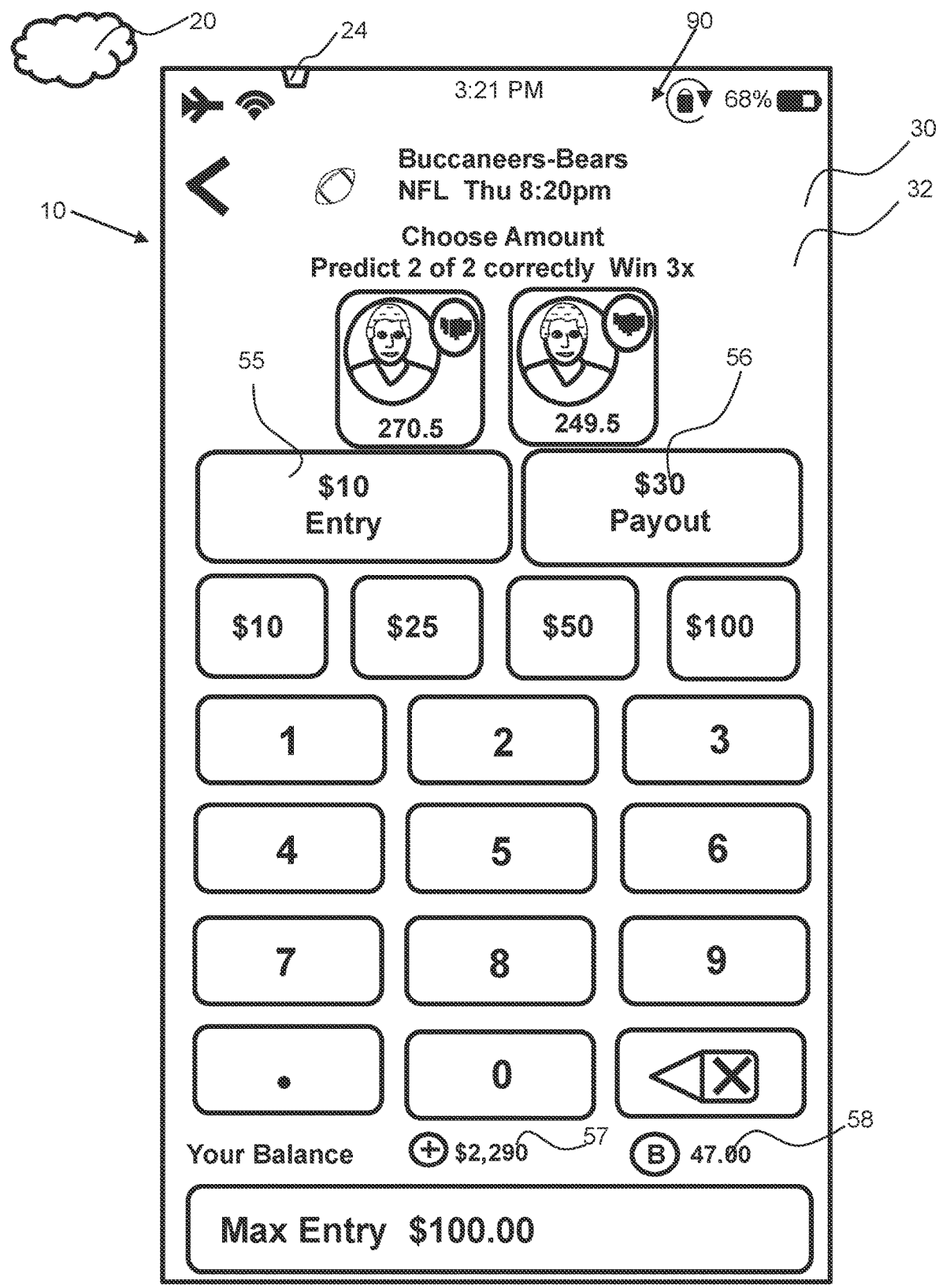
FIG. 11 shows a display of a Contest Entry page of the electronic wagering system arrived at after clicking the Continue input on FIG. 10, and having input features for inputting a wager amount including a keyboard for typing in a wager amount, and entry amount icons configured in a row at the top of the keyboard.

As shown in FIG. 11, a Contest Entry page 90 of the electronic wagering system 10 is presented after clicking the "Continue" input on FIG. 10. The Contest Entry page includes wagering input features for inputting a wager 55 amount including a keyboard for typing in a wager amount, and entry amount icons configured in a row at the top of the keyboard. The Max Entry amount is also posted on this page and the active user's wager can not exceed this value. The Active User may wager with actual monetary currency from their monetary currency balance 57 of $2,290 or they can wager with Non-Monetary System Currency (NMSC) 58 as indicated with the "B" in the circle of 47.50. The "B"

standing for "Betting Bucks". As shown, the Active User has wagered $10 from their balance and the payout 56 is $30 if they win the contest.

Figure 12:
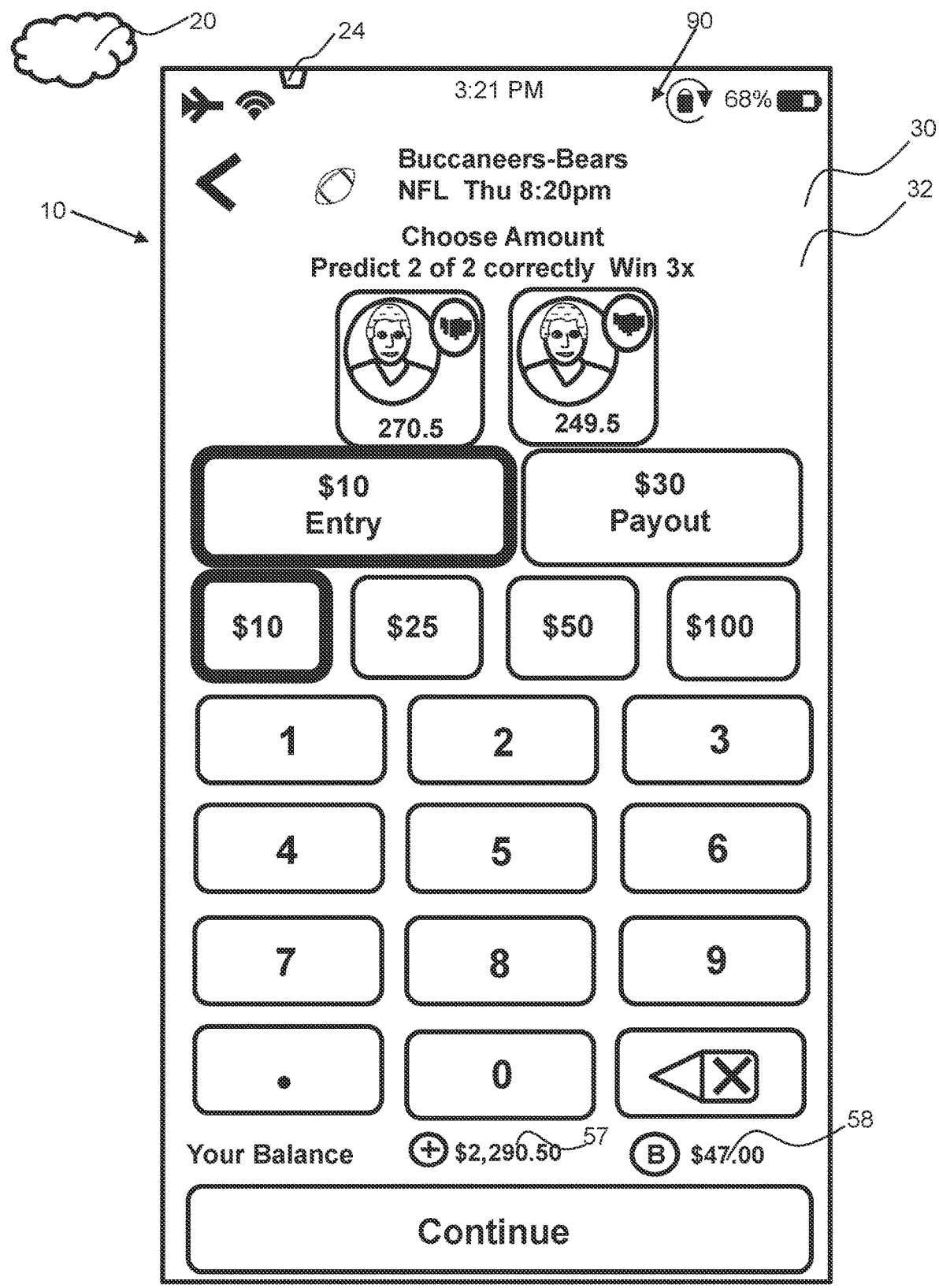
FIG. 12 shows a display of the Contest Entry page shown in FIG. 11, with the user selecting the $10 wager icon, and the payout shown next to the wagered amount.

As shown in FIG. 12, the Contest Entry page shown in FIG. 11, now shows the active user selection of the $10 wager icon, and the payout is shown next to the wagered amount.

Figure 13:
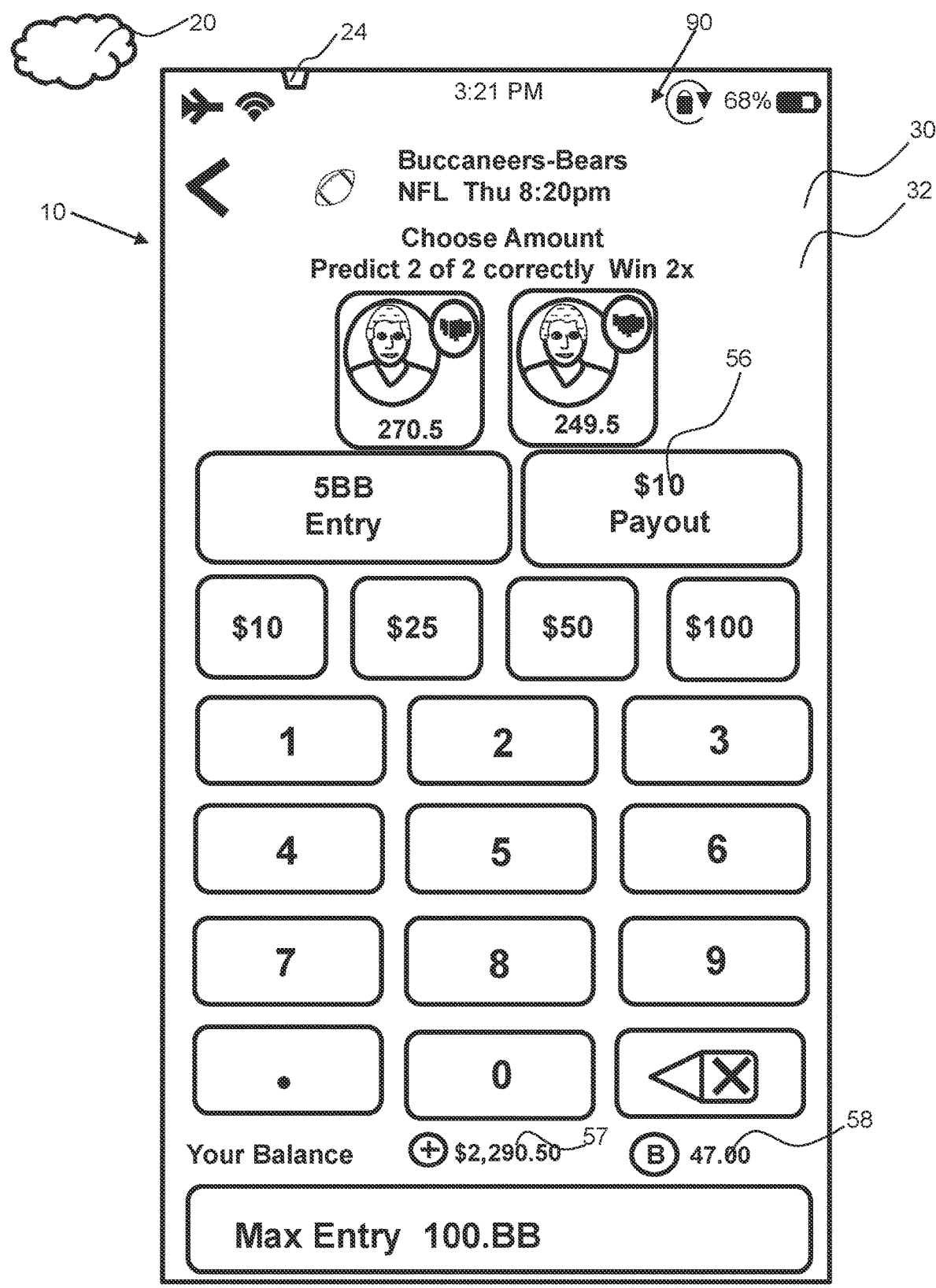
FIG. 13 shows a display of the Contest Entry page shown in FIG. 11, with the user selecting NMSC icon, to wager 5 NCSC with a 2× payout shown next to the wagered amount.

As shown in FIG. 13, the Active User has selected to wager 5 of the NMSC 58 and the payout 56 is $10 in actual monetary currency. When wagering with the NMSC, the payout includes the value of the entry fee of NMSC, which in this case is less than $5, so the payout is less than if the wager amount was in dollars, in this case with a payout multiple that is one less than when wagering with monetary currency. If the payout is 3x for a cash wager from the currency balance 57, then the payout for a wager with NMSC 58 is 2x, for example.

Figure 14:
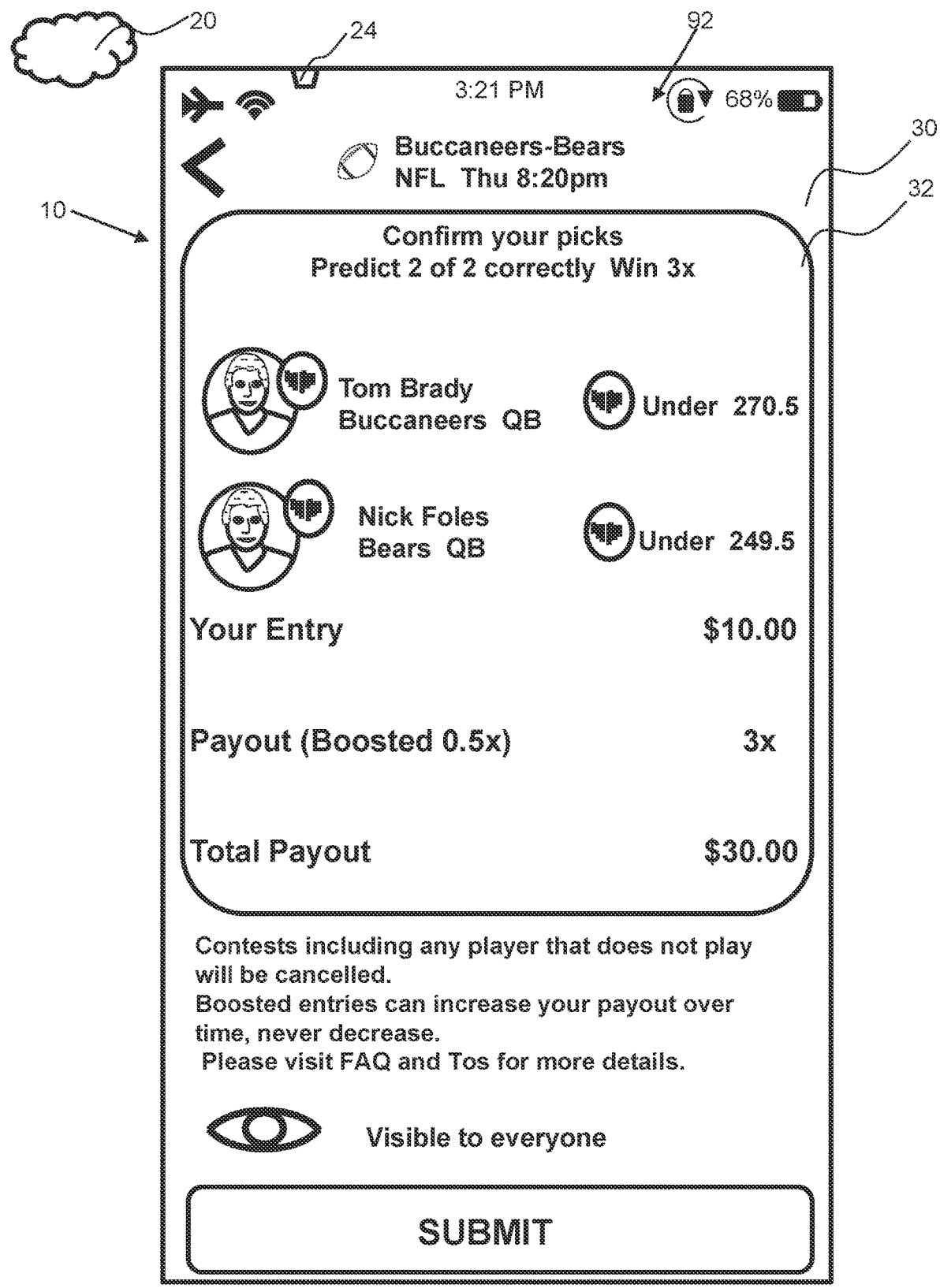
FIG. 14 shows a display of a Contest Submission page that includes a summary of the contest, the amount wagered, the payout including any Boosted payout amounts and a submission icon for the user to confirm entry into the contest.

As shown in FIG. 14 a display of Contest Submission page 92 includes a summary of the contest, the amount wagered, the payout including any Boosted payout amounts and a Submit icon for the user to confirm entry into the contest.

Figure 15:
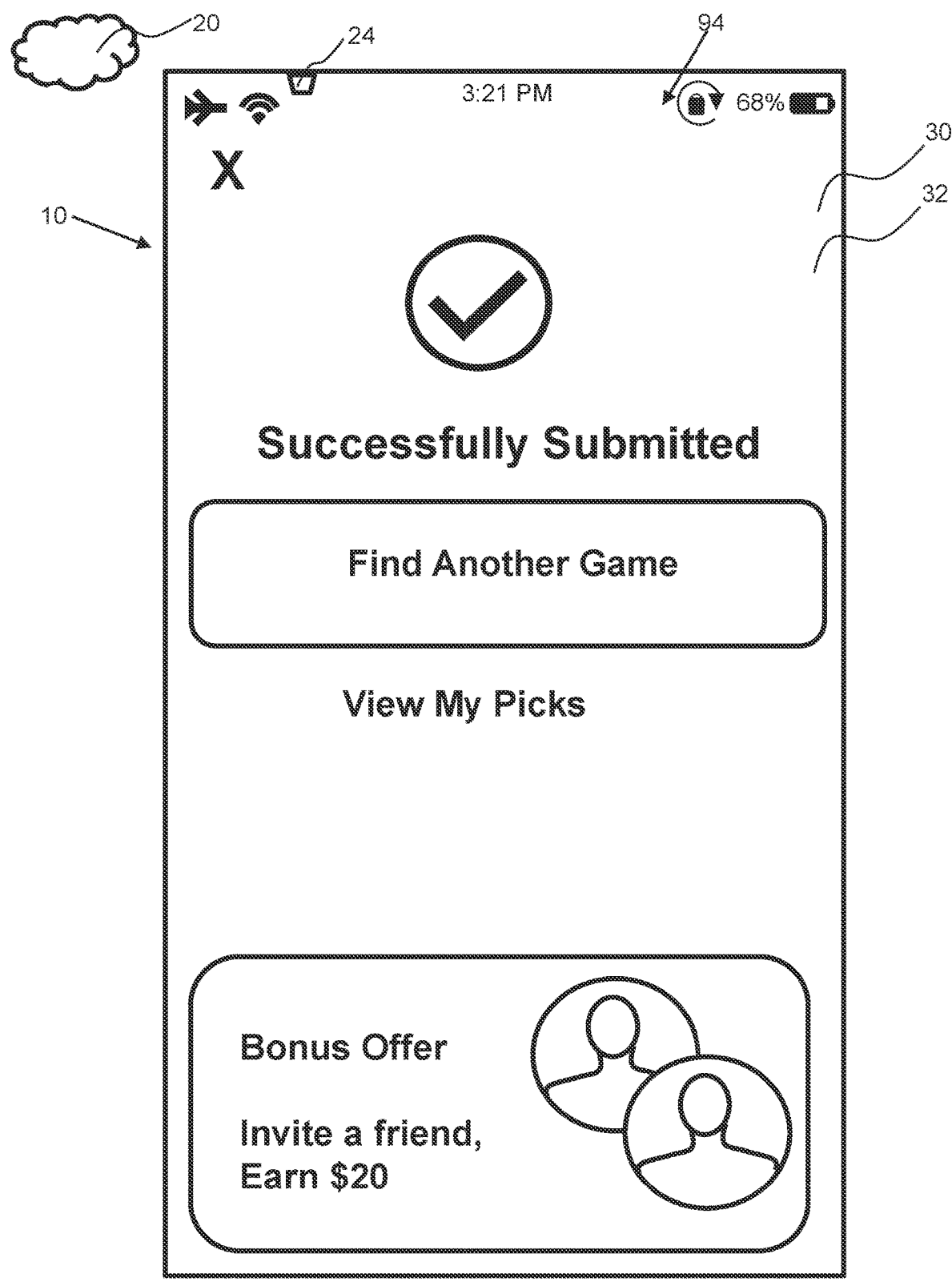
FIG. 15 shows a display of a Contest Submission Confirmation page, that confirms the user's entry into the contest and presents additional payout boosting options, such as invite a friend to the entered contest to boost the payout.

As shown in FIG. 15, a Contest Submission Confirmation page 94, confirms the user's entry into the contest and presents additional payout boosting options, such as invite a friend to the entered contest to boost the payout. When the active player hits the Invite A Friend button, you can share the contest entered with a friend in your contact list, through the electronic wagering system 10, or through email or text. If a friend accepts the invite, such as clicking on a link that enables them to enter the contest, sent to the friend by the active user, the active user and the friend will be following each other. If the friend is already a user on the electronic wagering system 10, the link may send them directly to the contest page for them to make picks and enter the same contest. If the friend is not a user of the electronic wagering system, then the link may take them to a page for registering to be a user of the exemplary electronic wagering system. The link may take them to an App store, for them to download the App. The active user that invites a friend may get additional rewards for friends that sign up to the electronic wagering system from a link sent by the active user. The link may be associated with the Active User, contest or both for the active user to get a boosted payout or a reward.

Figure 16:
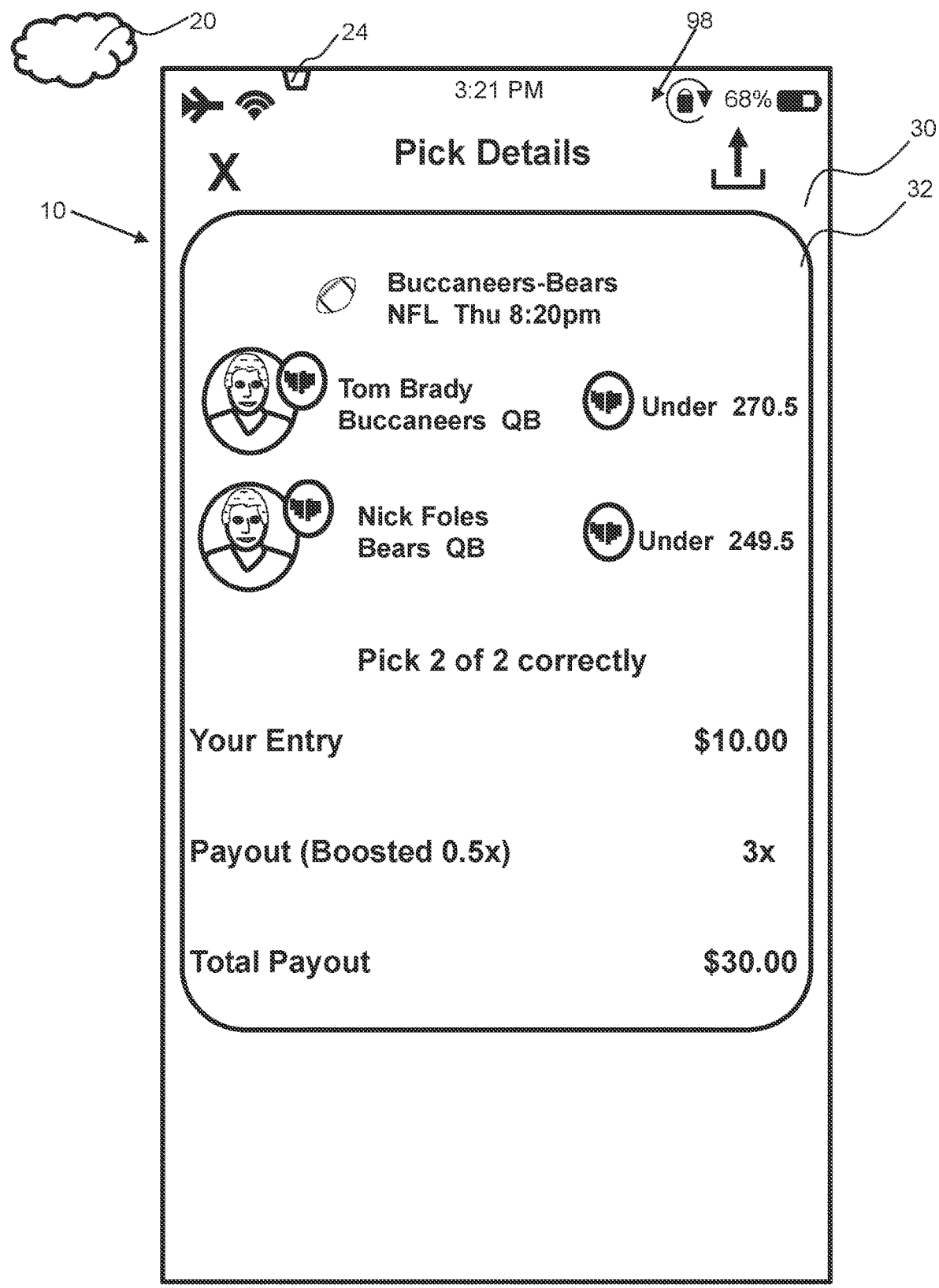
FIG. 16 shows a display of an Entered Contest Details page showing details on the combined propositional contest the user entered.

As shown in FIG. 16, an Entered Contest Details page 98 shows details on the combined propositional contest the Active user entered. This is a cash wager versus a wager with NMSC and the payout is 3x the wager for a payout of $30 for the $10 wager.

Figure 17:
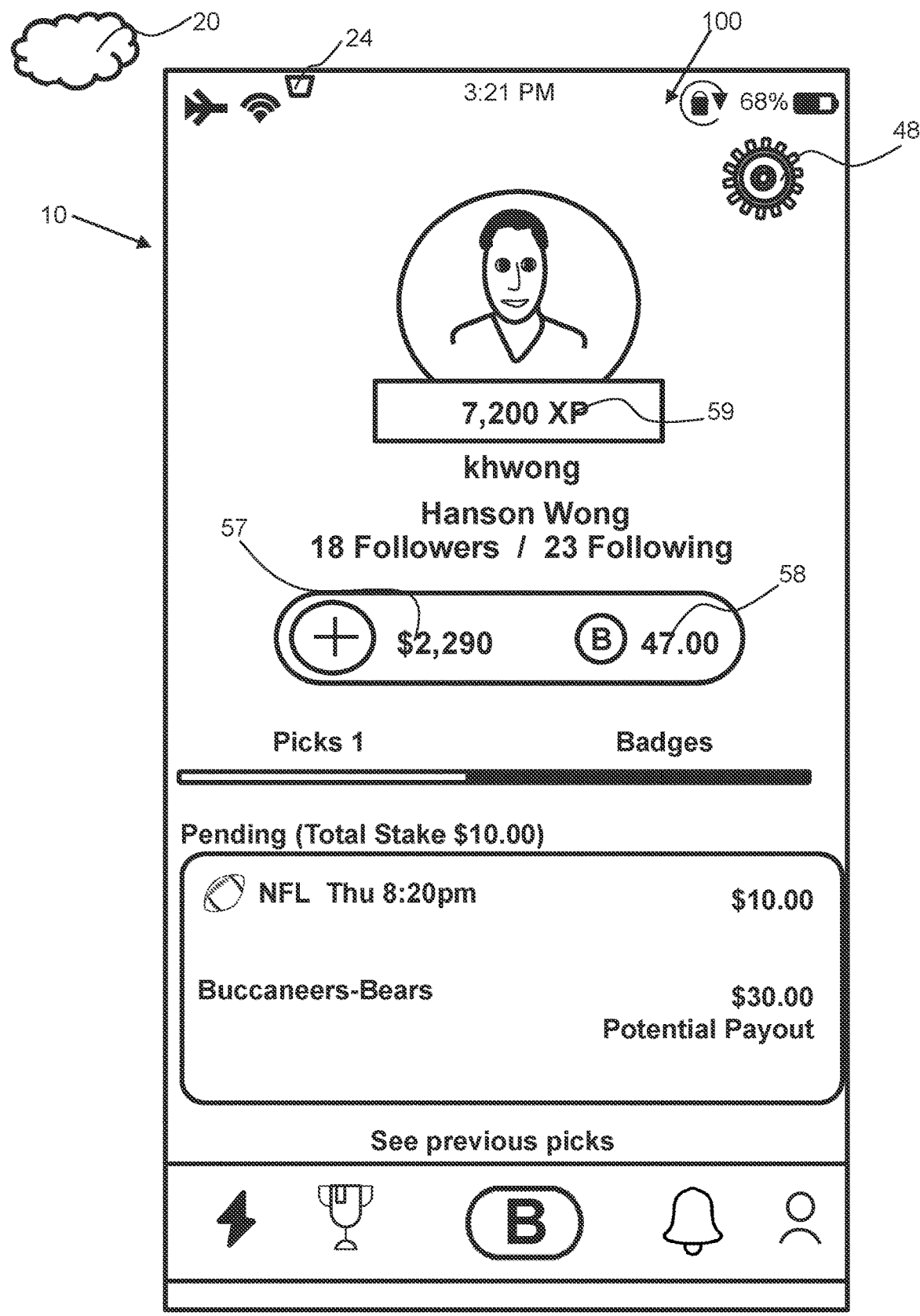
FIG. 17 shows a display of a User's Profile page that displays the user's system name, user's balance, rewards, such as NMSC, XP amount, the number of following users and number of users followed as well as the user's contest entries and details of the contest.

As shown in FIG. 17, a User's Profile page 100 displays the Active User's system name, Active User's cash currency balance 57, rewards, such as NMSC 58, XP 59 amount, the number of following users of the Active user and the number of users followed by the Active user, as well as the user's contest entries and details of the contest. The Active user may scroll up to see additional contests that they are currently entered into. Also shown is a tool icon 48 that opens a tool page for editing the Active User's profile.

Figure 18:
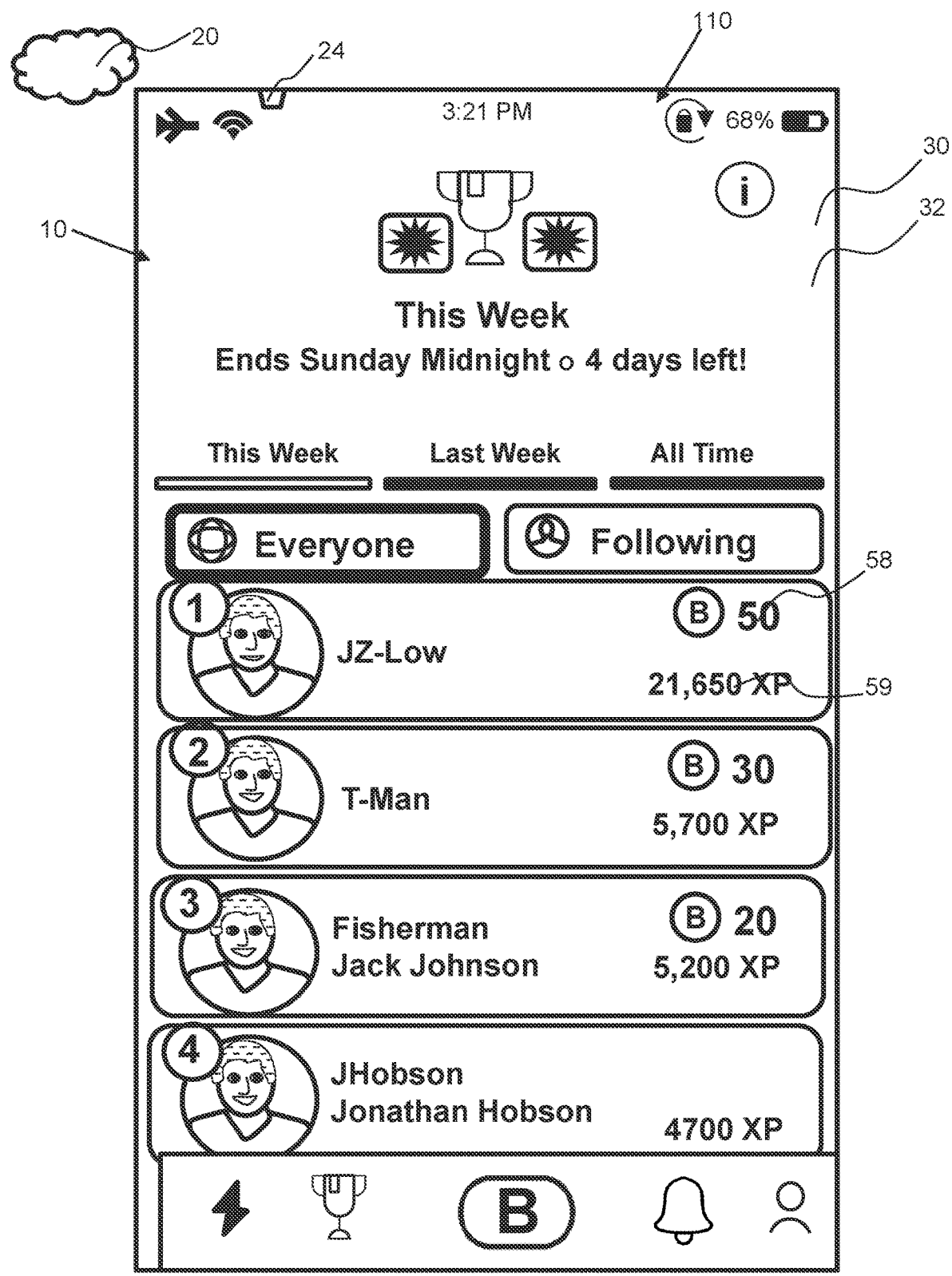
FIG. 18 shows a display of a Leaderboard page showing users that have entered contests and the XP points they have accumulated.

As shown in FIG. 18, a Leaderboard page 110 shows users that have entered contests and the XP points they have accumulated. The leaderboard may be updated each week or month of some other range of time, or may be changed in real time as people wager and gain XP points. Also shown, are the NMSC awarded for reaching that level. As detailed herein, the payouts may be different for contests entered with NMSC than payouts for contests entered with monetary currency. Rewards may be presented to users for their position on the leaderboard and the reward may be NMSC 58. As shown this display shows the leaders from the Everyone selection. The active user can also click the Following icon to display a list of users that they are following that are on the leader board. Note that the leader board may show the leaders in descending order with respect to their accumulated XP points.

Figure 19:
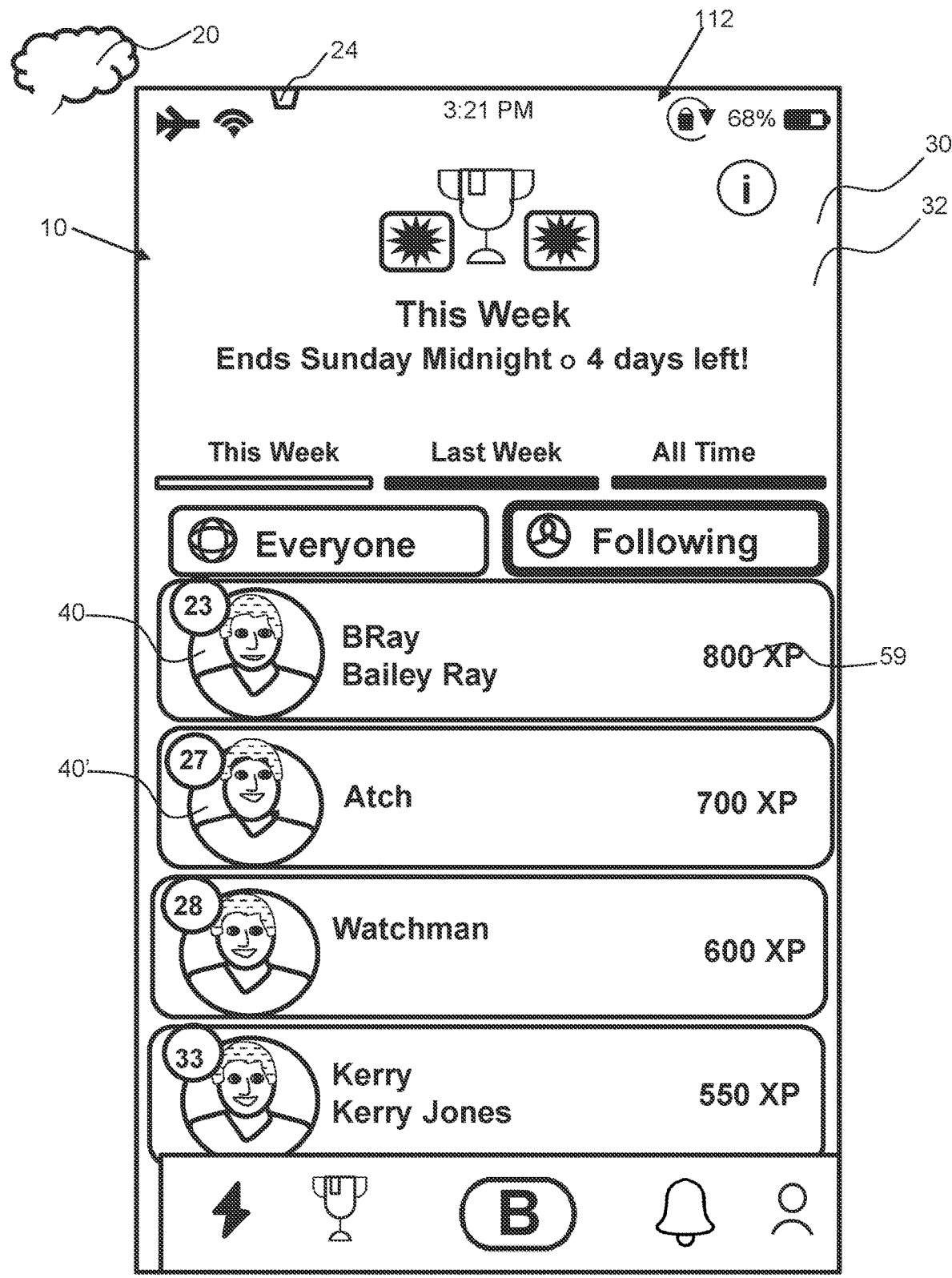
FIG. 19 shows a display of a Following Leaderboard page that displays users that are followed by the Active User and the XP points they have accumulated.

FIG. 19 shows a display of a Following Leaderboard page 112 that displays the users that Active user is following and the XP 59 points they have accumulated. The Following icon has been selected as indicated by the bold boarder around the icon.

Figure 20:
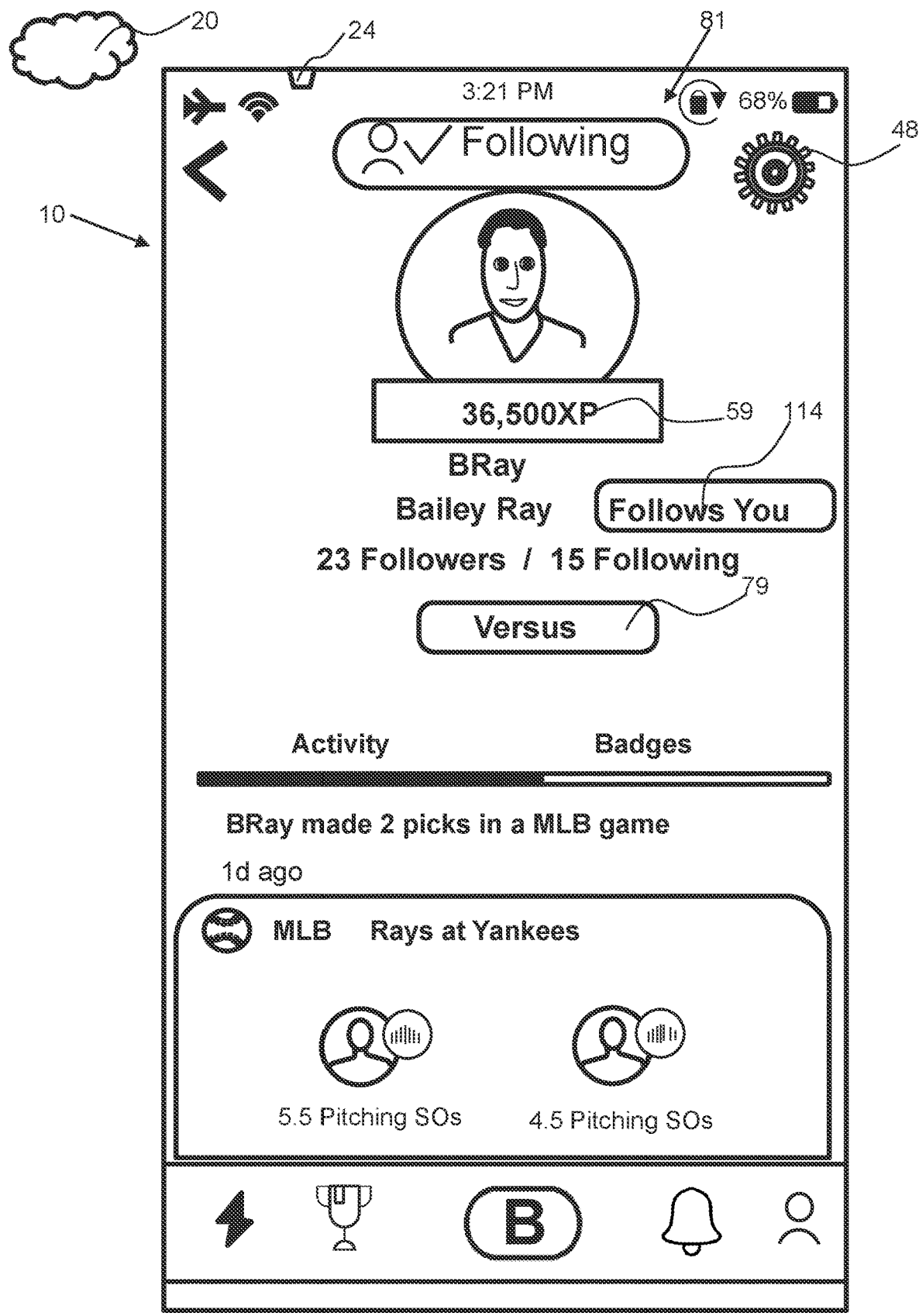
FIG. 20 shows a display view of the first following user from the list of following users shown in FIG. 19 and the details of this first following user's entry on the contest.

FIG. 20 shows of the first Following User from the list of following users shown in FIG. 19 and the details of this first Following User's entry on a contest. This first Following User is also a follower as indicated by the "Follows You" icon 114. A user may click the back button, top left and then click on other following users to see the details of their entries in contests. The Active User can scroll the display screen to see other contests the Following User is entered into and/or has entered in the past. Also shown is a versus icon 79 that will open a display that shows data comparing contests that have been entered by the Active User and the Following User, and/or Heads-Up contests between these two users. The versus page may also show other data regarding contest entries between the two users, even those not mutually entered, such as number entered contests, number of contests entered by sports type or participant or team, amount wagered, percent of contest wins, etc. The number or percentage of correct entries for all contest entries may be shown by sport type or sport team, compared with the Active User, for example.

Figure 21:
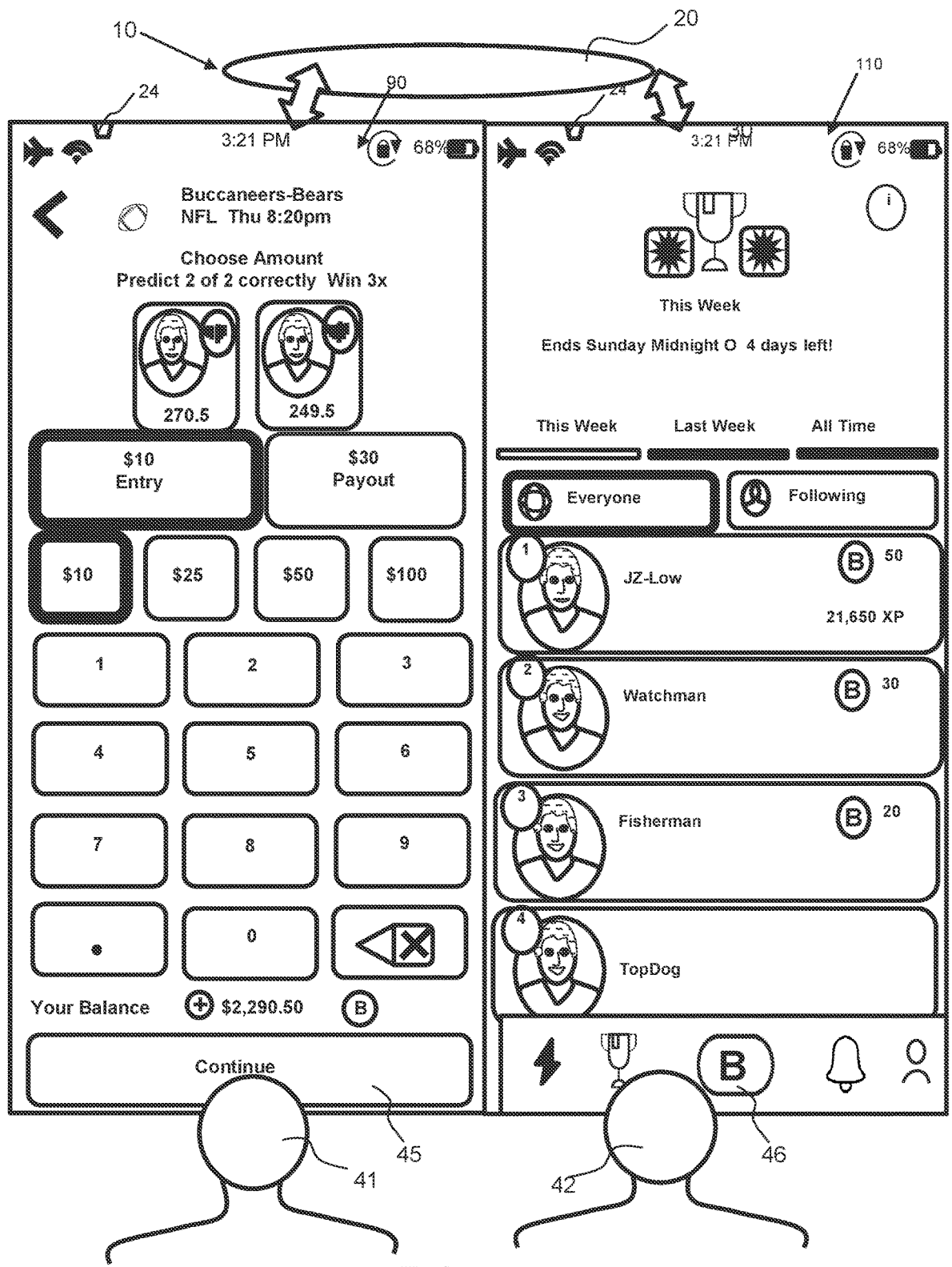
FIG. 21 shows users of the electronic wagering system placing wagers on contests and engage with other users.

FIG. 21 shows a First User 41 and a Second User 42 interfacing with the electronic wagering system 10. The First User is placing a wager on a contest on a contest entry page 90 using the First User interface 45 and the Second User is viewing the Leaderboard page 110 on the second user interface 46.

Figure 22:
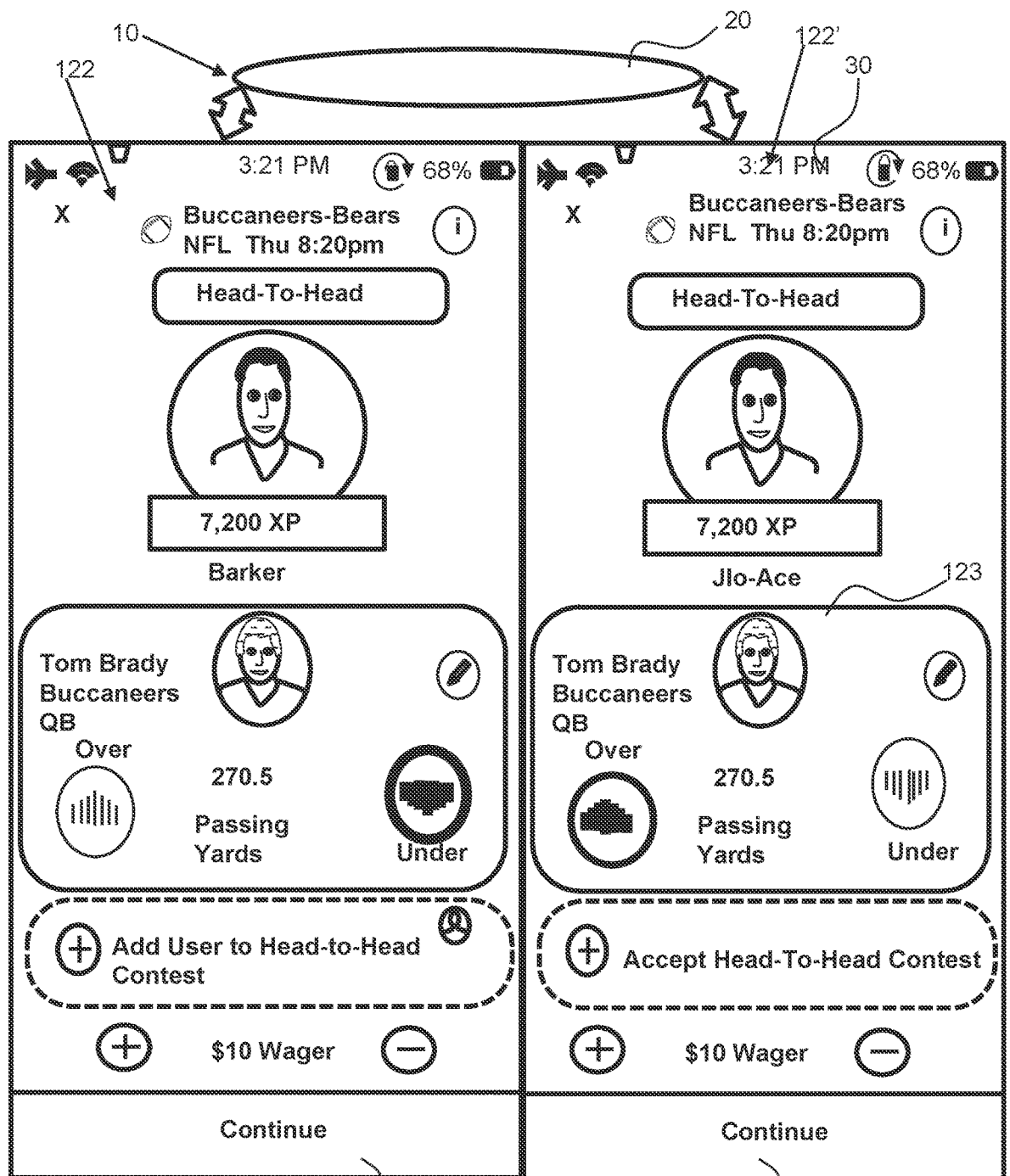
FIG. 22 shows users of the electronic wagering system engaging in a head-to-head contest.

FIG. 22 shows a head-to-head contest pages 122, 122' that enables a First User 41 to send a head-to-head contest 123 to the Second User 42. The Payout may be a portion of the wager as the electronic wagering system 10 may charge an administrative fee. The Second User may increase of decrease the wager amount with the + and − icons and then hit continue to counteroffer back to the First User, or they may simply accept the contest and hit continue for the $10 wager.

Figure 23:
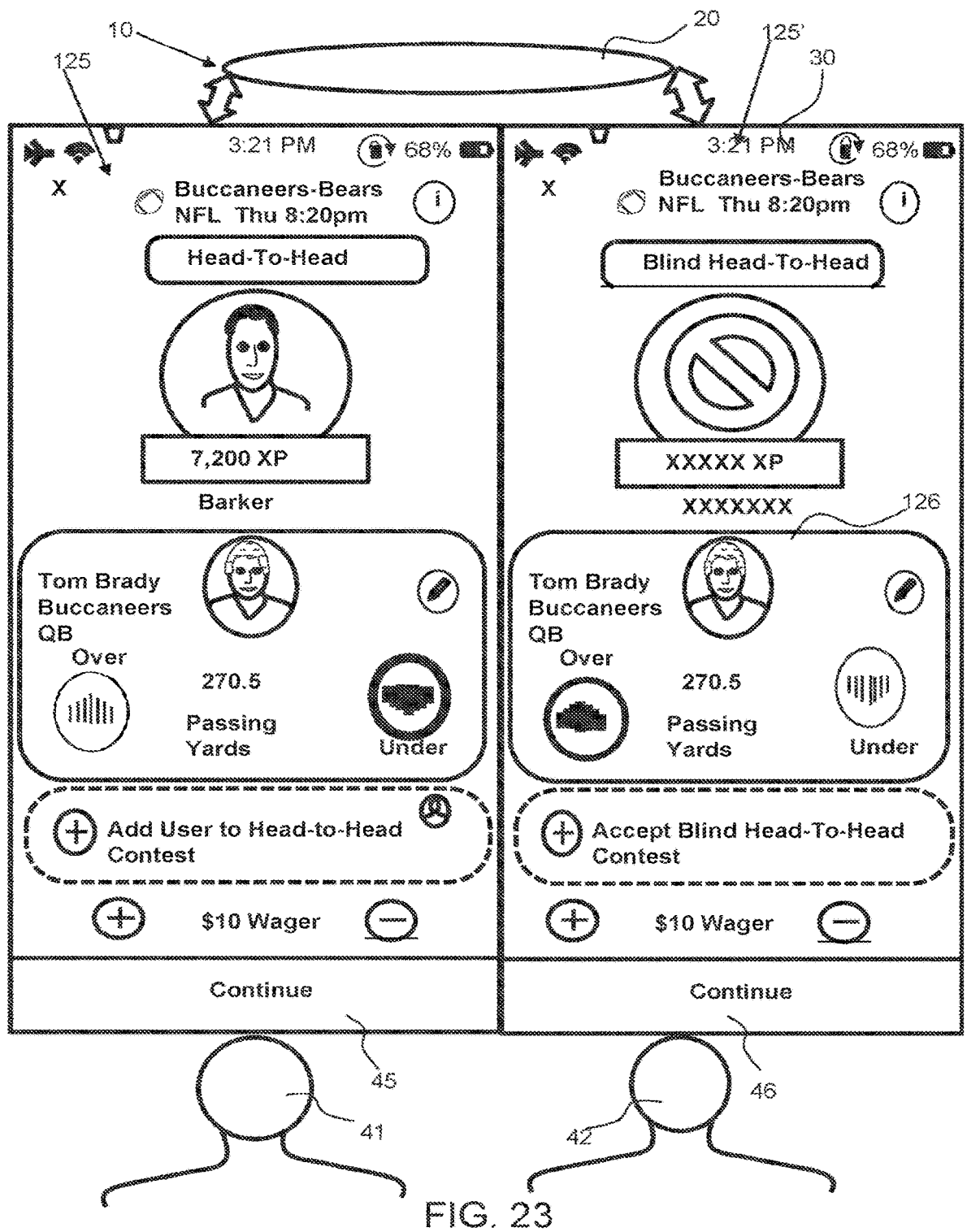
FIG. 23 shows users of the electronic wagering system engaging in a blind head-to-head contest.

FIG. 23 shows anonymous head-to-head contest pages 125, 125', wherein the First User 41 sends an anonymous head-to-head contest 126 to the Second User 42. As shown, the Second User is presented with a contest having the contest details but not the identity of the First user that sent this contest. The identity of the First User may be revealed to the Second User at the end of the contest. The Second User may increase of decrease the wager amount with the + and − icons and then hit continue to counteroffer back to the First User, or they may simply accept the contest and hit continue for the $10 wager.

Figure 24:
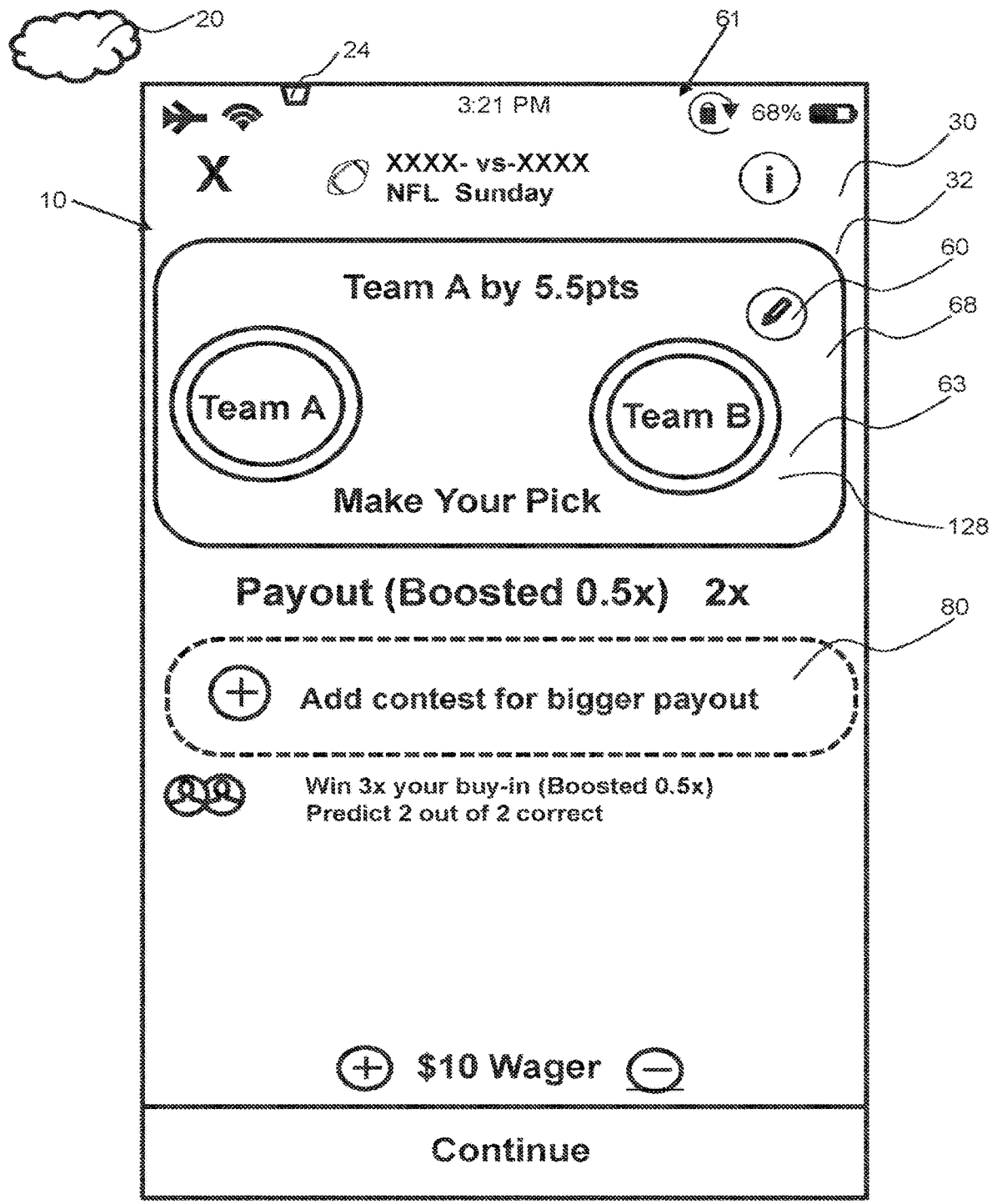
FIG. 24 shows a display of a blind contest wherein the names of the participants, such as teams in this case for the NFL game are not revealed.

FIG. 24 shows a display of a blind contest 128 wherein the names of the participants, such as teams in this case for the NFL game, are not revealed. This is a win/lose/draw contest 68 on the final outcome of the game. The contest is Team A by 5.5 pts over Team B. The Active User may add additional contest to boost the payout. A blind contest may provide some details of the participants past performance. A blind contest may be a propositional contest with a performance outcome of a player in the contest with the player's name hidden or not revealed. A blind contest may have a limited time for a user to enter to avoid any research to determine the teams or players in the blind contest, such as a minute or less, about 30 seconds or less, about 15 seconds or less and any range between and including the time values provided.

Figure 25:
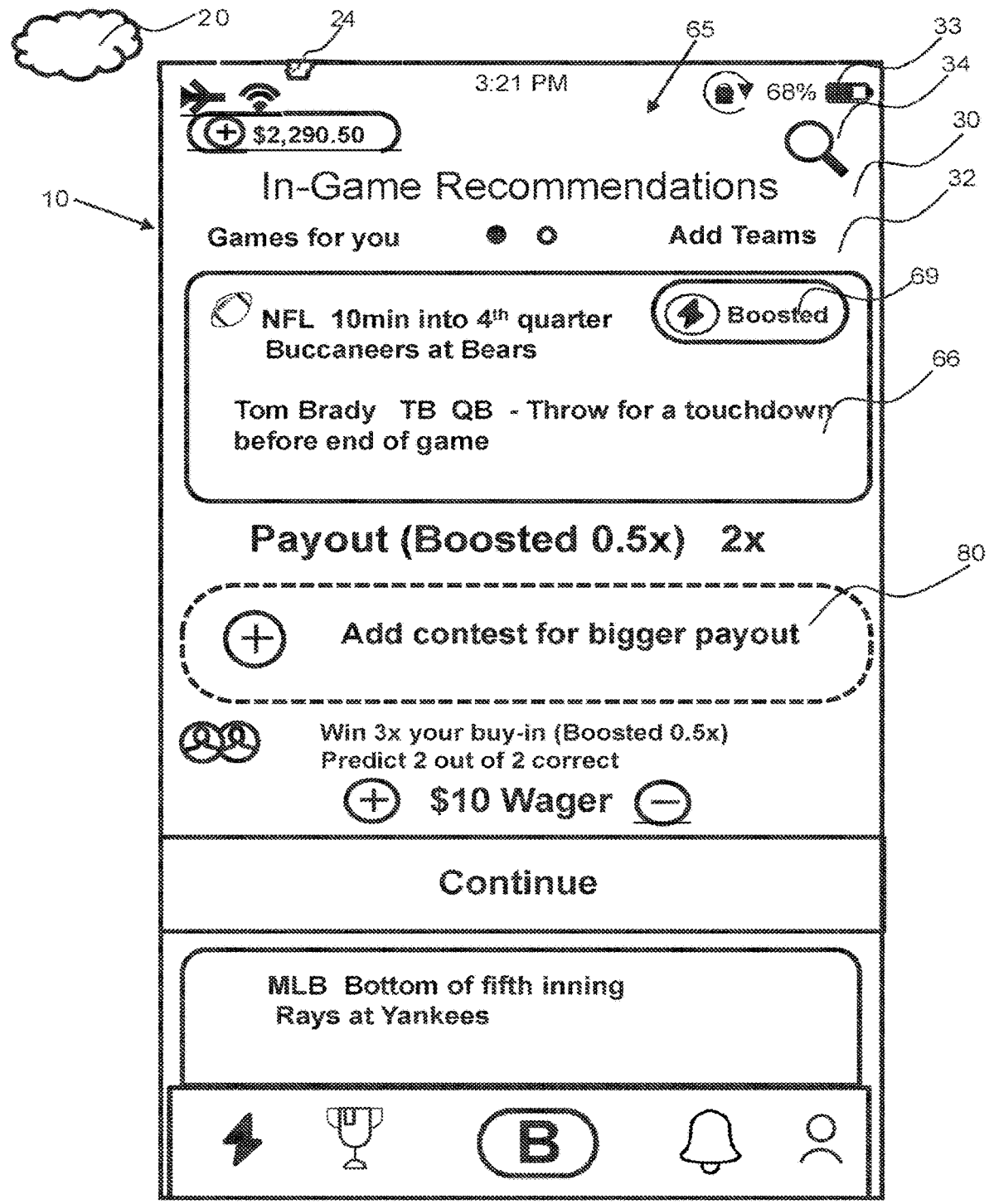
FIG. 25 shows a display of an In-Game Recommendations page, that presents to the Active User in-game contests 66 for games in progress.

FIG. 25 shows a display of an In-Game Recommendation page 65, that presents to the Active User in-game contests 66 for games in progress. The payout and propositional metrics of an In-Game Recommendation may change as the game progresses. For example, an in-game contest that Tom Brady will throw for a touchdown by the end of the game may have increasing payouts as the time remaining in the game diminishes.

Figure 26:
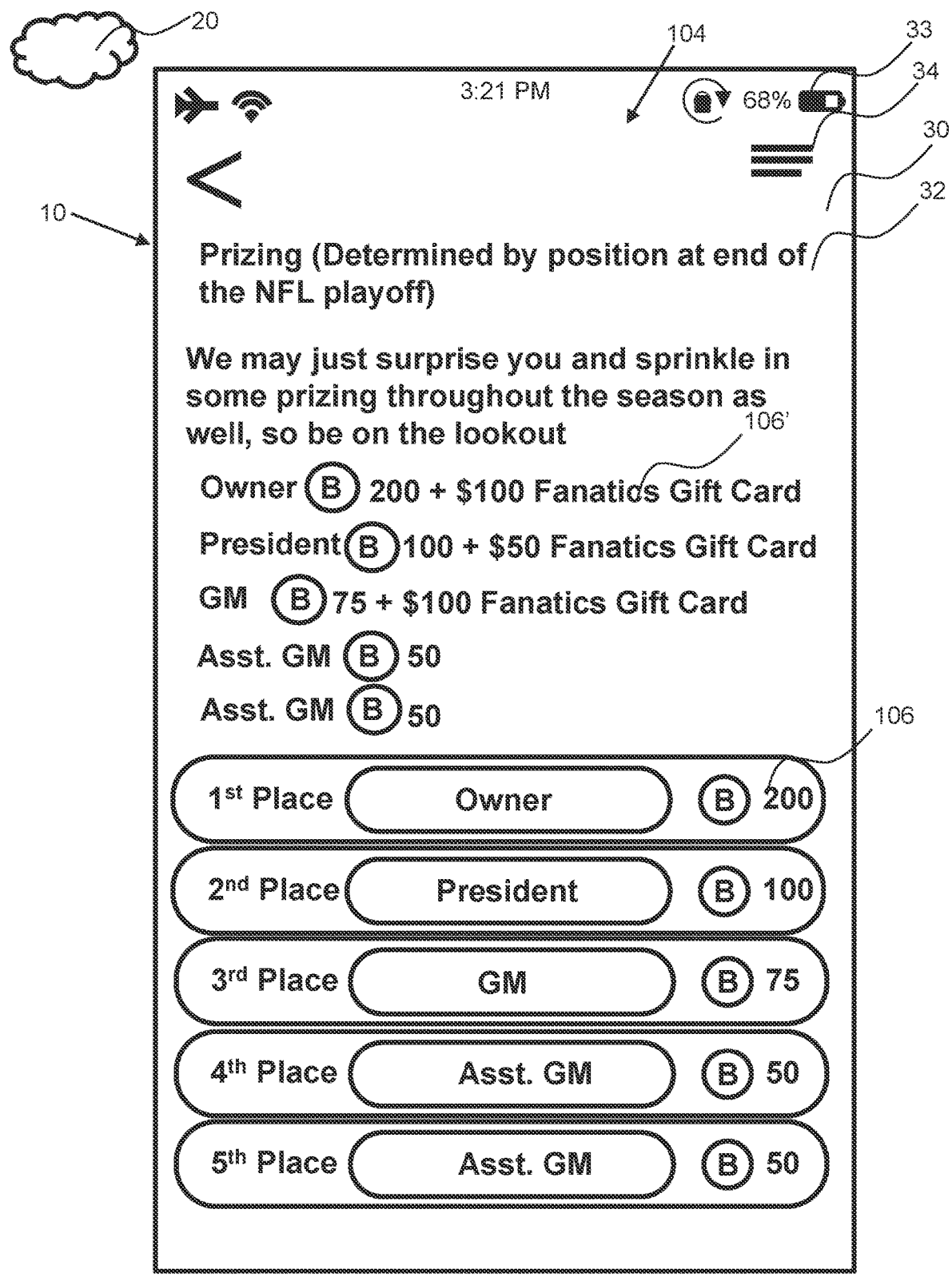
FIG. 26 shows a display of details of prizing and rewards.

FIG. 26 shows a display of details of a prizing and rewards page 104. As shown the user that achieves the "Owner" status will receive a reward 106 of 200 NMSC as indicated by the B in the circle followed by the amount of NMSC rewarded. Also, the "Owner" will receive a reward 106' of a $100 gift card that they can use to purchase merchandise. The ranking and status positions are determined by user's activity with the electronic wagering system which may include the quantity of wagers, the amount wagers, the percentage of contests won and the like.

Figure 27:
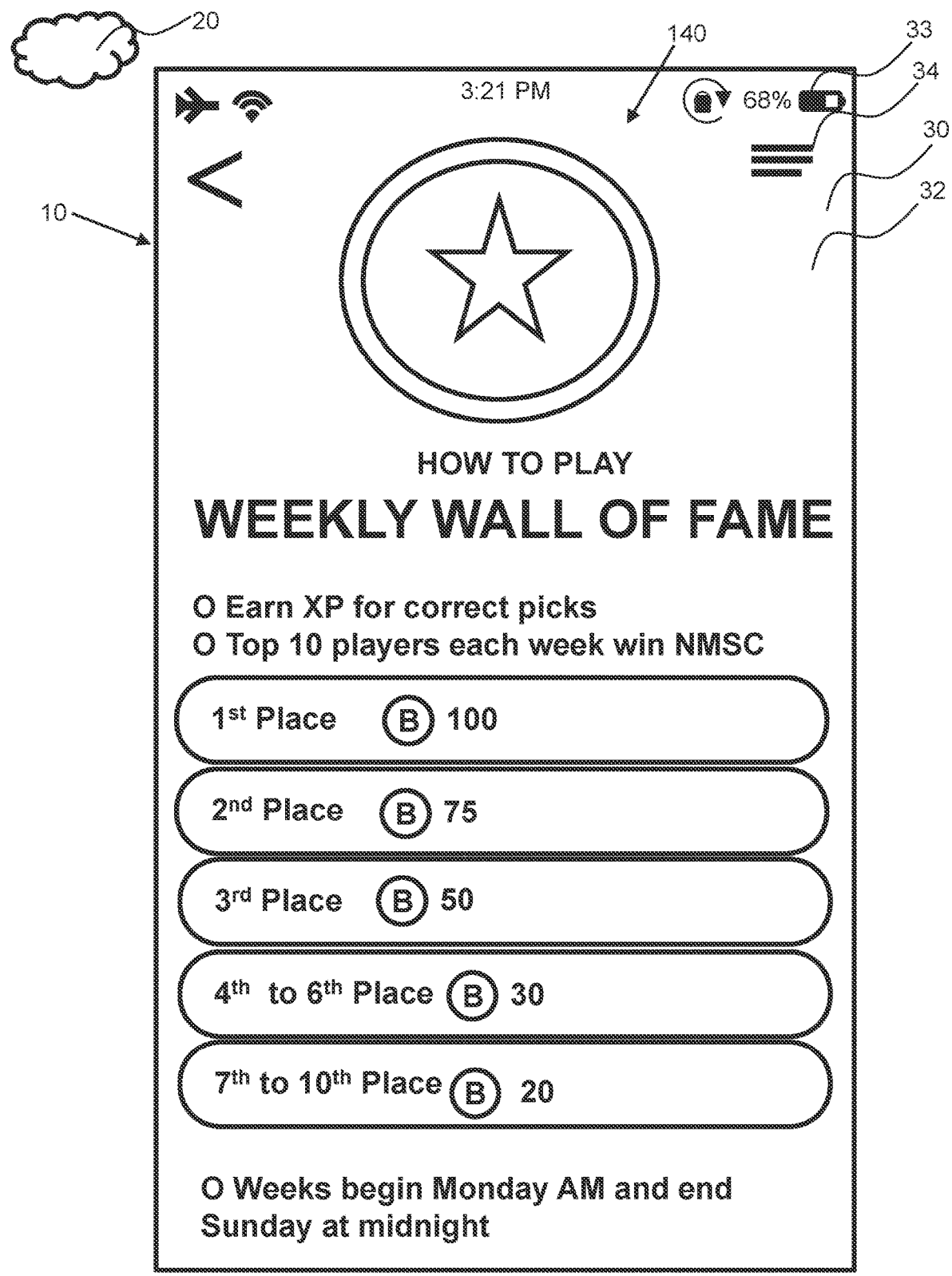
FIG. 27 shows a display of details of the weekly wall of fame winner.

FIG. 27 shows a Wall of Fame page 140, having a display of details of the Weekly Wall of Fame Winner. As shown NMSC is a reward for users with the most XP at the end of the week.

Figure 28:
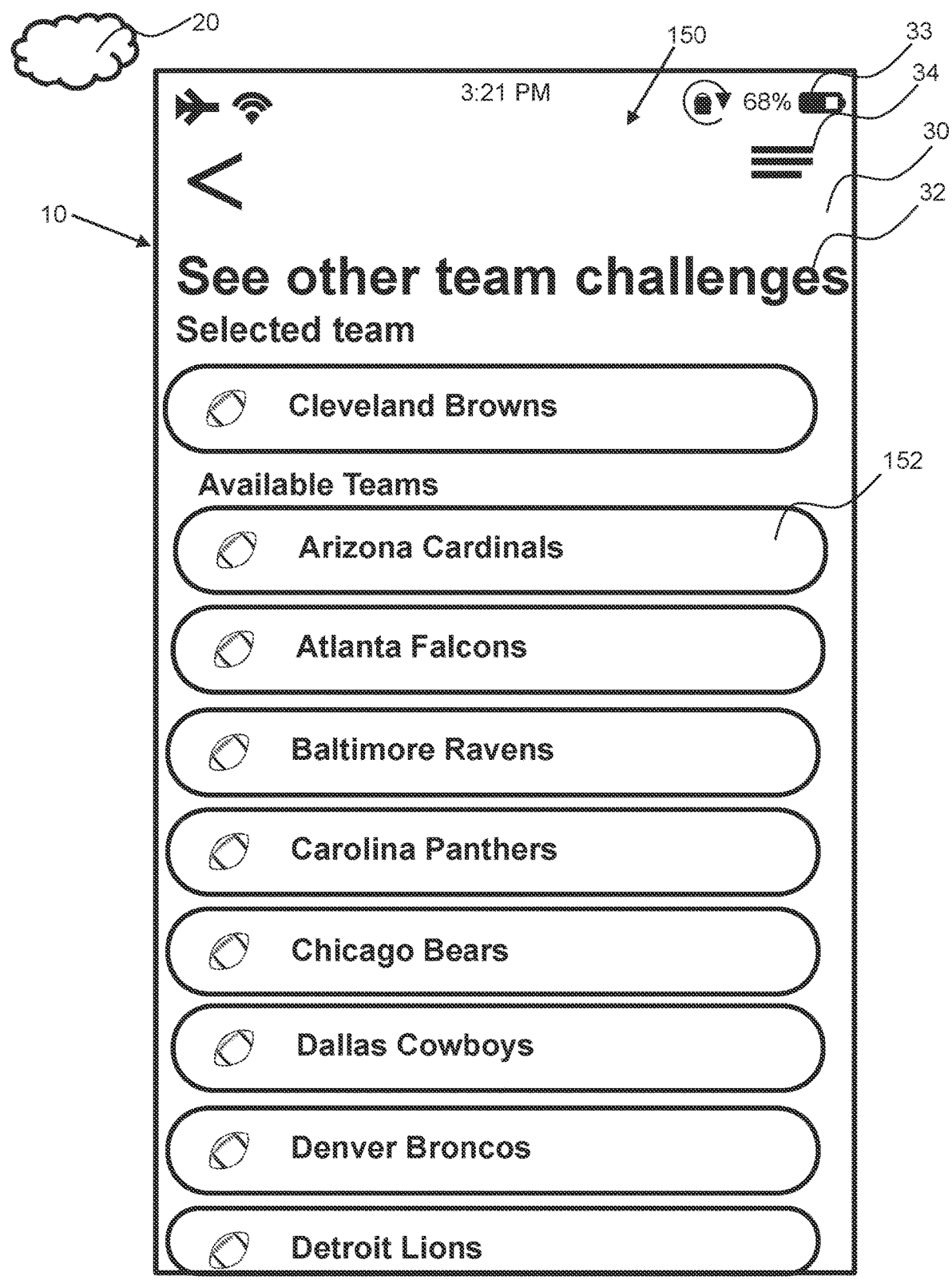
FIG. 28 shows a display of groups that a user may join.

FIG. 28 shows a groups page 150 having a plurality of groups 152 that a user may join. In this case, the groups are team groups for NFL teams. As described herein, any number of groups may be joined including groups by geographical region, team or sports type and the like. Also, some groups may be entered based on activity with the electronic wagering system, such as number of wagers, amount wagered and percentage of correct wagers.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A computer-implemented method comprising:
   receiving, by one or more processors of an electronic prediction system and from a database, data associated with a posted contest;
   receiving, by the one or more processors of the electronic prediction system and from a first user device, a first user input comprising a first user prediction on the posted contest;
   receiving, by the one or more processors of the electronic prediction system and from a second user device, a second user input comprising a second user prediction on the posted contest, wherein the second user device is communicatively coupled in a conference setting with the first user device;
   retrieving, by the one or more processors of the electronic prediction system from the database, a confirmation of the first user prediction and the second user prediction on the posted contest and a threshold number of won contests of each user device over a period of time;
   determining, by the one or more processors of the electronic prediction system, a winning group of the posted contest to receive a reward, based on a posted contest outcome and the threshold number of won contests of each user device over the period of time; and
   providing, by the one or more processors of the electronic prediction system, a notification of the winning group of the posted contest.

2. The computer-implemented method of claim 1, wherein the reward is determined based on a number of users in the winning group.

3. The computer-implemented method prediction of claim 2, wherein the reward is increased in response to determining that the first user invites a threshold number of invited users that enter the posted contest by placing a wager on the posted contest.

4. The computer-implemented method of claim 1, wherein the electronic prediction system rewards the first user with the reward in response to determining that a threshold number of users enter the posted contest by placing a wager on the posted contest.

5. The computer-implemented method of claim 1, wherein the electronic prediction system rewards a first prediction set of users that enter the posted contest by placing a wager on the posted contest with the reward in response to determining that a threshold number of users enter the posted contest by placing a wager on contest.

6. The computer-implemented method of claim 1, wherein the electronic prediction system rewards users that enter the posted contest with the reward in response to determining that a threshold number of users enter the posted contest by placing a wager on contest.

7. The computer-implemented method of claim 1, wherein the electronic prediction system rewards the first user with the reward in response to determining that a cumulative wager on the posted contest is greater than a threshold value.

8. The computer-implemented method of claim 1, wherein the electronic prediction system rewards a first set of users that enter the posted contest by placing a wager on the posted contest with the reward in response to determining that a cumulative wager on the posted contest is greater than a threshold value.

9. The computer-implemented method of claim 1, wherein the electronic prediction system rewards all users that enter the posted contest by placing a wager on the posted contest with the reward in response to determining that a cumulative wager on the posted contest is greater than a threshold value.

10. The computer-implemented method of claim 1, wherein the electronic prediction system rewards the first user with the reward in response to determining that the first user invites a threshold number of invited users that enter the posted contest by placing a wager on the posted contest.

11. The computer-implemented method of claim 1, further comprising:
   sending, by the electronic prediction system, to members of the sports team fan group a notice of a contest involving a sports team.

12. The computer-implemented method of claim 1, further comprising:
   sending, by the electronic prediction system, to members of a fan group a notice of a contest involving a sports person.

13. The computer-implemented method of claim 1, wherein the first user device or the second user device is included in a group comprising a geographical group for a geographical area.

14. The computer-implemented method of claim 13, wherein the electronic prediction system sends members of the geographical group a notice of a contest involving a sports team from geographical area.

15. The computer-implemented method of claim 1, wherein the first user device or the second user device is included in a group comprising any members of a sports team fan group of a sports rivalry of rivalry teams.

16. The computer-implemented method of claim 15, wherein the electronic prediction system sends members of the sports rivalry group a notice of a rivalry contest between rivalry teams.

17. The computer-implemented method of wagering of claim 1, wherein the electronic prediction system provides performance group data comprising a percent of correct contest entries.

18. The computer-implemented method of claim 1, wherein the electronic prediction system provides a comparison performance group data that comprises a ratio of correct contest entries of a first group of users to a second group of users.

\* \* \* \* \*